US008529355B2

(12) United States Patent
Hiratake et al.

(10) Patent No.: US 8,529,355 B2
(45) Date of Patent: Sep. 10, 2013

(54) STORAGE MEDIUM STORING INFORMATION PROCESSING PROGRAM, INFORMATION PROCESSING APPARATUS AND INFORMATION PROCESSING METHOD

(75) Inventors: Shinya Hiratake, Kyoto (JP); Takayuki Shimamura, Kyoto (JP); Yoshikazu Yamashita, Kyoto (JP); Masahiro Nakamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 644 days.

(21) Appl. No.: 12/481,057

(22) Filed: Jun. 9, 2009

(65) Prior Publication Data

US 2010/0001952 A1    Jan. 7, 2010

(30) Foreign Application Priority Data

Jul. 3, 2008  (JP) ................................ 2008-174870

(51) Int. Cl.
*A63F 9/24*   (2006.01)

(52) U.S. Cl.
USPC .......... 463/43; 463/1; 463/5; 463/49; 463/57; 273/108.1; 273/127 R; 273/148 R; 273/340; 273/348; 273/361; 273/367; 715/706; 345/1.1

(58) Field of Classification Search
USPC ............. 463/1–5, 7–9, 30–34, 36–39, 40–43, 463/49–57; 273/108.1, 127 R, 148 R, 148 B, 273/309, 317.1, 340, 348, 361–367; 345/1.1–3.4, 156, 157, 160, 419, 473–475, 345/618–619, 629, 660–671; 348/37, 119, 348/141–142, 240.99, E13.022–E13.027, 348/E13.036; 715/706, 738, 757–759, 762–764, 766, 781–783, 715/788, 794–795, 798, 801–802, 807
IPC . A63F 09/24, 13/00, 13/06, 13/10; G06F 17/00
See application file for complete search history.

(56) References Cited

U.S. PATENT DOCUMENTS 4,988,981 A * 1/1991 Zimmerman et al. ........ 345/158
5,526,022 A * 6/1996 Donahue et al. ............. 345/156

(Continued)

FOREIGN PATENT DOCUMENTS

EP    1 441 279 A2    7/2004
EP    1 852 163 A2    11/2007

(Continued)

OTHER PUBLICATIONS

Search Report issued on Mar. 12, 2012 in corresponding European Application No. 09162614.3.

(Continued)

*Primary Examiner* — Pierre E Elisca
(74) *Attorney, Agent, or Firm* — Nixon & Vanderhye, P.C.

(57) ABSTRACT

A game apparatus includes a CPU, and the CPU controls a moving object within a virtual space on the basis of acceleration data and angular velocity data which are transmitted from a controller. For example, before the angular velocity data is above a predetermined magnitude, a position and an orientation of the moving object is controlled on the basis of the angular velocity data. When the angular velocity data is above the predetermined magnitude, an initial velocity of the moving object is decided on the basis of the acceleration data, and a moving direction (orientation) of the moving object is decided on the basis of the angular velocity data. Thereafter, the moving object moves within the virtual space according to a general physical behavior.

15 Claims, 25 Drawing Sheets

(56) References Cited

U.S. PATENT DOCUMENTS

| | | | |
|---|---|---|---|
| 5,704,837 A * | 1/1998 | Iwasaki et al. | 463/38 |
| 5,781,165 A * | 7/1998 | Tabata | 345/8 |
| 5,913,727 A * | 6/1999 | Ahdoot | 463/39 |
| 6,283,857 B1 * | 9/2001 | Miyamoto et al. | 463/31 |
| 6,514,142 B1 * | 2/2003 | Hattori et al. | 463/31 |
| 6,720,949 B1 * | 4/2004 | Pryor et al. | 345/158 |
| 7,223,173 B2 * | 5/2007 | Masuyama et al. | 463/36 |
| 7,352,358 B2 | 4/2008 | Zalewski et al. | 345/156 |
| 7,843,425 B2 * | 11/2010 | Lu et al. | 345/156 |
| 7,850,526 B2 * | 12/2010 | Zalewski et al. | 463/36 |
| 7,854,655 B2 * | 12/2010 | Mao et al. | 463/30 |
| 8,096,881 B2 | 1/2012 | Taira | |
| 8,187,096 B2 | 5/2012 | Ohta et al. | |
| 2003/0109298 A1 * | 6/2003 | Oishi et al. | 463/8 |
| 2006/0256072 A1 * | 11/2006 | Ueshima et al. | 345/156 |
| 2007/0270223 A1 * | 11/2007 | Nonaka et al. | 463/37 |
| 2008/0004112 A1 * | 1/2008 | Pines et al. | 463/37 |
| 2008/0015031 A1 * | 1/2008 | Koizumi et al. | 463/43 |
| 2008/0120057 A1 | 5/2008 | Fukushima et al. | |
| 2008/0139307 A1 * | 6/2008 | Ueshima et al. | 463/31 |

FOREIGN PATENT DOCUMENTS

| | | |
|---|---|---|
| JP | 2000-308756 | 11/2000 |
| JP | 2007-282787 | 11/2007 |
| JP | 2007-296173 | 11/2007 |
| JP | 2008-136681 | 6/2008 |

OTHER PUBLICATIONS

Office Action issued in corresponding Japanese Patent Application No. 2008-174870 dated Jun. 25, 2013.

* cited by examiner

FIG. 4
(A)
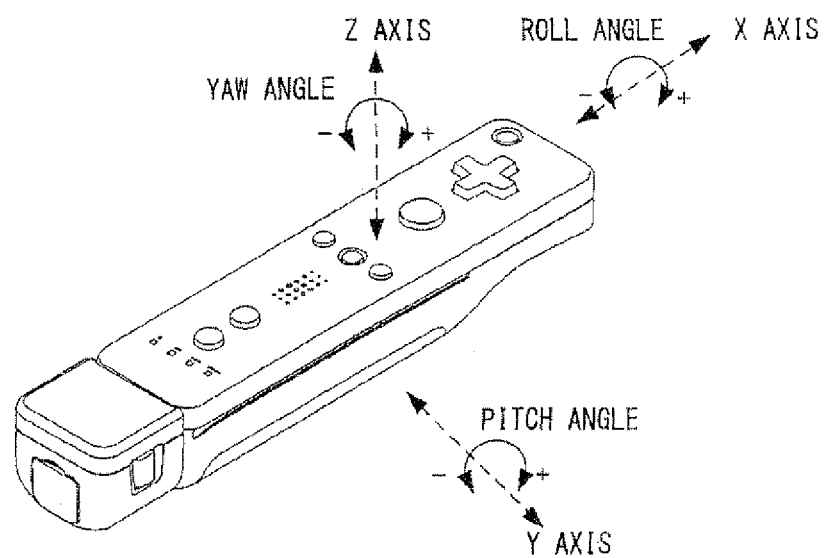
(B)
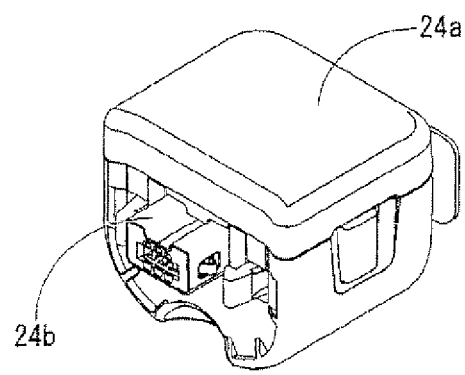
(C)
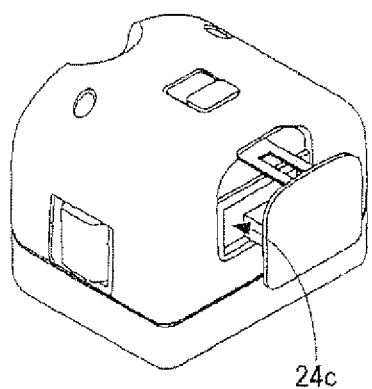

FIG. 17
(A) THREE-DIMENSIONAL POSITION
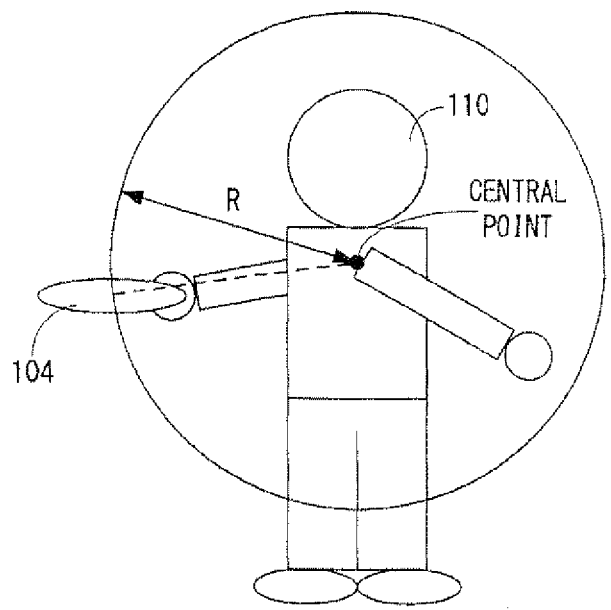
(B) REAR VIEW
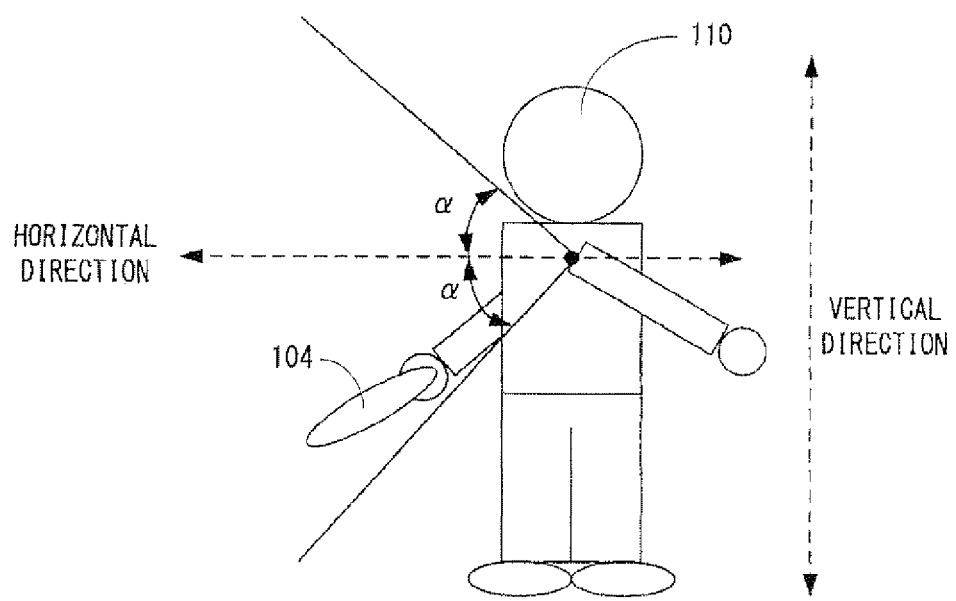

FIG. 18
(A) TOP VIEW
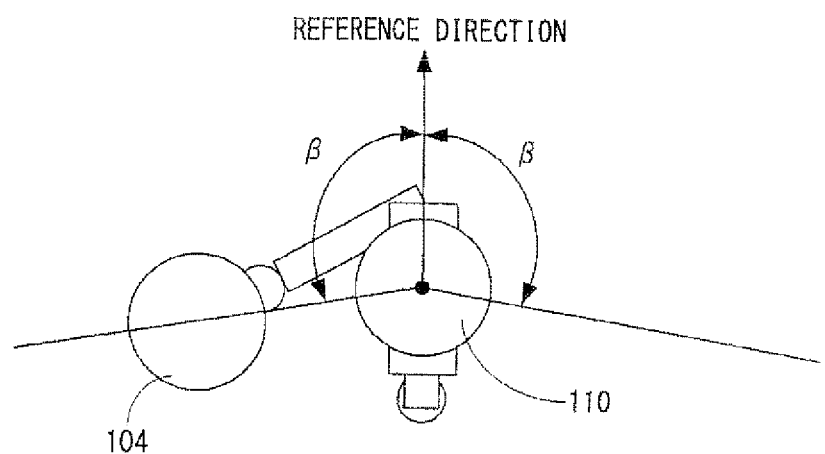
(B) SIDE VIEW
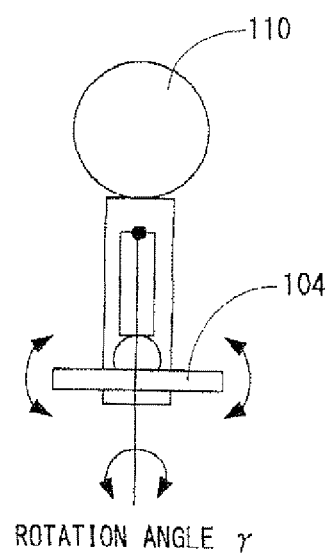

FIG. 19
(A) VELOCITY RELATIVE TO MOVEMENT OF MOVING OBJECT
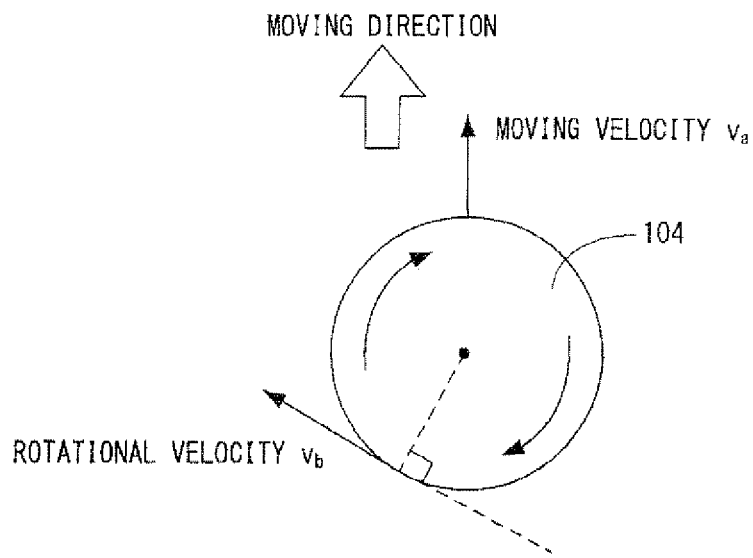
(B) AIR RESISTANCE WITH RESPECT TO MOVING OBJECT
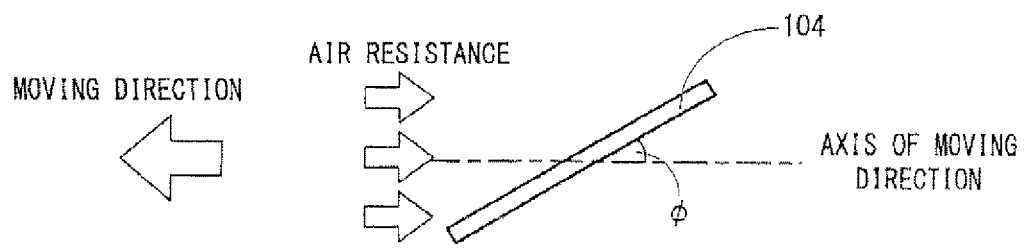
(C) DRAWING WHEN SEEING SURFACE BEING SUBJECT TO AIR RESISTANCE FROM FRONT
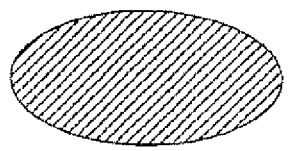

FIG. 20
(A) GRAVITY
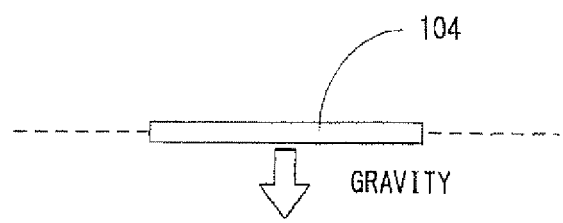
(B) LIFT (ROTATION, GROUND EFFECT)
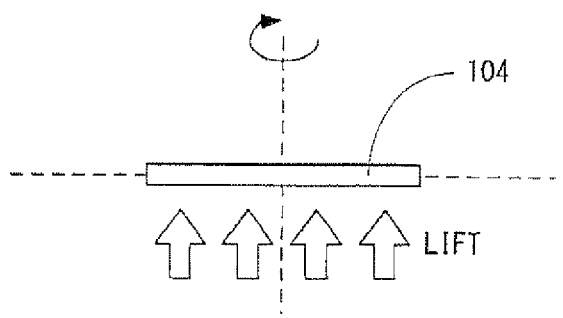

STORAGE MEDIUM STORING INFORMATION PROCESSING PROGRAM, INFORMATION PROCESSING APPARATUS AND INFORMATION PROCESSING METHOD

CROSS REFERENCE OF RELATED APPLICATION

The disclosure of Japanese Patent Application No. 2008-174870 is incorporated herein by reference.

BACKGROUND OF THE INVENTION

1. Field of the Invention

This invention relates to a storage medium storing an information processing program, an information processing apparatus, and an information processing method. More specifically, the present invention relates to a storage medium storing an information processing program, an information processing apparatus and an information processing method for controlling motions of an object in a virtual space on the basis of a status signal output from a detecting means for detecting a status including at least a position and an attitude of an input device.

2. Description of the Related Art

One example of the related art of an information processing apparatus of such a kind is disclosed in Japanese Patent Application Laid-Open No. 2000-308756 [A63F 13/00] laid-open on Nov. 7, 2000. An input controlling device of a game apparatus of the related art has a multi-axis acceleration sensor and a multi-axis gyro sensor. In the game apparatus utilizing this input controlling device, outputs from the multi-axis gyro sensor are used in order to produce orientation data relative to turning (twisting) a sword, orientation data relative to turning the sword forward and backward, and right and left. Furthermore outputs from the multi-axis acceleration sensor are used in order to produce data of swinging a sword, such as data relative to strong and weak, and data relative to movements in forward and backward, right and left, and up and down directions.

In the input controlling device of the related art, an attitude of the input controlling device is calculated by utilizing angular velocity information of a rotational movement obtained from the multi-axis gyro sensor. In the related art, however, a detail of method of calculating an attitude of the input controlling device is not described. In order to calculate an attitude of a device with a gyro sensor, method of accumulating angular velocity information is generally employed. However, in the input controlling device with this multi-axis gyro sensor, the information obtained from the multi-axis gyro sensor was only used for calculating an attitude of the input controlling device, never giving versatility, such as throwing (moving) an object existing in a virtual space. In addition, in order to confirm other motions, a multi-axis acceleration sensor is required to be separately provided, making the input controlling device itself expensive.

SUMMARY OF THE INVENTION

Therefore, it is a primary object of the present invention to provide a novel storage medium storing an information processing program, a novel information processing apparatus and a novel information processing method.

Another object of the present invention is to provide a storage medium storing an information processing program, an information processing apparatus and an information processing method which are able to execute various processing on the basis of a gyro signal.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing an information processing program, and the information processing program causes a computer of an information processing apparatus controlling a motion of an object within a virtual space on the basis of a status signal output from a detecting means for detecting a status including at least one of a position and an attitude of an input device to function as a first motion controlling means for controlling the object such that it performs a first motion within the virtual space on the basis of the status signal, a condition determining means for determining whether or not information relative to a magnitude of the status signal satisfies a predetermined condition, and a second motion controlling means for controlling the object such that it performs a second motion different from the first motion within the virtual space on the basis of the status signal in a case that the condition determining means determines that the information relative to a magnitude of the status signal satisfies a predetermined condition.

In the first invention, an information processing program is executed by a computer (40, 42, etc.) of an information processing apparatus (12) controlling a motion of an object within a virtual space (104) on the basis of a status signal output from a detecting means (24, 92) for detecting a status including at least one of a position and an attitude of an input device (22). A first motion controlling means (40, S5, S15) controls the object such that it performs a first motion within the virtual space on the basis of the status signal. A condition determining means (40, S21, S63, S73) determines whether or not information relative to a magnitude of the status signal satisfies a predetermined condition. A second motion controlling means (40, S29) controls the object such that it performs a second motion different from the first motion within the virtual space on the basis of the status signal in a case that the condition determining means determines that information relative to a magnitude of the status signal satisfies a predetermined condition.

According to the first invention, an object is caused to perform different motions on the basis of a magnitude of a status signal, so that it is possible to execute various processing based on a status signal relative to a position and an attitude of the controller.

A second invention is according to the first invention, and the detecting means includes a gyro sensor, and the status signal is a gyro signal.

In the second invention, the detecting means includes a gyro sensor, and a status including at least a position and an attitude of the input device is detected on the basis of a gyro signal of the gyro sensor.

According to the second invention, a position and an attitude of the input device are detected by utilizing a general-purpose sensor, such as a gyro sensor, allowing a movement of the object in the virtual space to be controlled by detecting a position and an attitude of the input device with a simple configuration.

A third invention is according to the second invention, and the condition determining means includes a gyro magnitude calculating means for calculating a magnitude of the gyro signal and a first gyro magnitude determining means for determining whether or not the magnitude of the gyro signal calculated by the gyro magnitude calculating means is above a first predetermined value, and the second motion controlling means controls the object such that it performs the second motion in a case that the first gyro magnitude determining means determines that the magnitude of the gyro signal is above the first predetermined value.

In the third invention, the condition determining means includes a gyro magnitude calculating means (40, S5) and a first gyro magnitude determining means (40, S73). The gyro magnitude calculating means calculates a magnitude of the gyro signal. The first gyro magnitude determining means determines whether or not the magnitude of the gyro signal calculated by the gyro magnitude calculating means is above a first predetermined value. The second motion controlling means controls a movement of the object according to the attitude determined based on the gyro signal, for example, such that it performs the second motion in a case that the first gyro magnitude determining means determines that the magnitude of the gyro signal is above the first predetermined value ("YES" in S73).

According to the third invention, in a case that the magnitude of the gyro signal is above the first predetermined value, a movement of the object within the three-dimensional virtual space can be controlled on the basis of the gyro signal.

A fourth invention is according to the third invention, and the second motion controlling means includes a movement controlling means for controlling a moving velocity and a moving direction of the object on the basis of the gyro signal in a case that it is determined that the magnitude of the gyro signal is above the first predetermined value.

In the fourth invention, a movement controlling means (40) controls a moving velocity and a moving direction of an object on the basis of the gyro signal in a case that it is determined that the magnitude of the gyro signal is above the first predetermined value. For example, an initial velocity and a direction of the object are decided, and then, the object is moved according to a general calculation of physics.

According to the fourth invention, it is possible to control the movement of the object on the basis of the gyro signal.

A fifth invention is according to the third invention, and the input device further includes an acceleration sensor, the information processing program causes the computer to further function as an acceleration calculating means for calculating an acceleration signal corresponding to an acceleration occurring to the input device on the basis of an output from the acceleration sensor, the second motion controlling means includes a moving velocity controlling means for controlling a moving velocity of the object on the basis of the acceleration signal calculated by the acceleration calculating means in a case that it is determined that the magnitude of the gyro signal is above the first predetermined value, a moving direction controlling means for controlling a moving direction of the object on the basis of the gyro signal in a case that it is determined that the magnitude of the gyro signal is above the first predetermined value.

In the fifth invention, the input device further comprises an acceleration sensor (74). The information processing program causes the computer to further function as an acceleration calculating means (40). The acceleration calculating means calculates an acceleration signal corresponding to an acceleration occurring to the input device on the basis of an output from the acceleration sensor. A moving velocity controlling means (40, S103) controls a moving velocity of the object on the basis of the acceleration signal calculated by the acceleration calculating means in a case that it is determined that the magnitude of the gyro signal is above the first predetermined value ("YES" in S73). For example, an initial velocity of the object is calculated. Furthermore, a moving direction controlling means (40, S85) controls a moving direction of the object on the basis of the gyro signal in a case that it is determined that the magnitude of the gyro signal is above a first predetermined value ("YES" in S73). For example, a direction of the initial velocity of the object, that is, a moving direction at a start of the movement is calculated.

According to the fifth invention, a moving velocity of the object is controlled on the basis of the acceleration calculated based on an output from the acceleration sensor provided to the controller, and a moving direction of the object is controlled on the basis of the gyro signal, so that it is possible to execute more various processing than when only the gyro signal is used.

A sixth invention is according to the third invention, and the information processing program causes the computer to further function as a gyro magnitude storing means for sequentially storing magnitude data corresponding to the magnitude of the gyro signal in a storing means, an extreme calculating means for calculating, on the basis of magnitudes of a plurality of gyro signals indicated by the magnitude data stored in the storing means, an extreme of the magnitudes of the gyro signals, a second gyro magnitude determining means for determining whether or not the extreme of the magnitude of the gyro signal calculated by the extreme calculating means is above a second predetermined value, and the second motion controlling means controls the object such that it performs the second motion within the virtual space on the basis of the gyro signal in a case that the second gyro magnitude determining means determines that the extreme is above the second predetermined value.

In the sixth invention, the information processing program causes the computer to further function as a gyro magnitude storing means (40, 502, S5, S13), an extreme calculating means (40, S57-S71), and a second gyro magnitude determining means (40, S73). The gyro magnitude storing means sequentially stores magnitude data (502b) corresponding to the magnitude of the gyro signal in a storing means. The extreme calculating means calculates on the basis of magnitudes of a plurality of gyro signals indicated by the magnitude data stored in the storing means, an extreme of the magnitudes of the gyro signals. The second gyro magnitude determining means determines whether or not the extreme of the magnitude of the gyro signal calculated by the extreme calculating means is above a second predetermined value. The second motion controlling means controls the object such that it performs the second motion within the virtual space on the basis of the gyro signal in a case that the second gyro magnitude determining means determines that the extreme is above the second predetermined value ("YES" in S73).

According to the sixth invention, in a case that an extreme of the magnitude of the gyro signal is above the second predetermined value, the object is moved by the second motion controlling means, preventing a malfunction due to an erroneous detection from occurring.

A seventh invention is according to the third invention, and the information processing apparatus is a game apparatus for controlling a motion of the object within the virtual space.

In the seventh invention, the information processing apparatus is a game apparatus (12) for controlling a motion of the object within the virtual space.

According to the seventh invention, it is possible to cause the object of the game in the virtual space to perform various processing on the basis of the gyro signal.

An eighth invention is according to the seventh invention, wherein the second motion controlling means includes a movement controlling means for controlling a moving velocity and a moving direction of the object on the basis of the gyro signal in a case that it is determined that the magnitude of the gyro signal is above the first predetermined value.

In the eighth invention also, similar to the fourth invention, it is possible to control the movement of the object on the basis of the gyro signal.

A ninth invention is according to the seventh invention, and the input device further comprises an acceleration sensor, the information processing program causes the computer to further function as an acceleration calculating means for calculating an acceleration signal corresponding to an acceleration occurring to the input device on the basis of an output from the acceleration sensor, and the second motion controlling means includes a moving velocity controlling means for controlling a moving velocity of the object on the basis of the acceleration signal calculated by the acceleration calculating means in a case that it is determined that the magnitude of the gyro signal is above the first predetermined value, and a moving direction controlling means for controlling a moving direction of the object on the basis of the gyro signal in a case that the magnitude of the gyro signal is above the first predetermined value.

In the ninth invention also, similar to the fifth invention, it is possible to execute more various processing than when only the gyro signal is used.

A tenth invention is according to the seventh invention, and the information processing program causes the computer to further function as a gyro magnitude storing means for sequentially storing magnitude data corresponding to the magnitude of the gyro signal in a storing means, an extreme calculating means for calculating, on the basis of magnitudes of a plurality of gyro signals indicated by the magnitude data stored in the storing means, an extreme of the magnitudes of the gyro signals, a second gyro magnitude determining means for determining whether or not the extreme of the magnitude of the gyro signal calculated by the extreme calculating means is above a second predetermined value, and the second motion controlling means controls the object such that it performs the second motion within the virtual space on the basis of the gyro signal in a case that the second gyro magnitude determining means determines that the extreme is above the second predetermined value.

According to the tenth invention also, similar to the sixth invention, it is possible to prevent malfunction due to an erroneous detection from occurring.

An eleventh invention is according to the first invention, and the first motion controlling means includes an arrangement controlling means for arranging the object within the virtual space according to at least any one of a position and an orientation which are decided on the basis of the status signal.

In the eleventh invention, an arrangement controlling means (40, S17) arranges the object within the virtual space according to at least any one of a position and an orientation which are decided on the basis of the status signal.

According to the eleventh invention, it is possible to arrange the object corresponding to positions and attitudes of the input device. Thus, the arranging positions of the object are also changed depending on the change in positions and attitudes of the input device. That is, the motion of the object is controlled.

A twelfth invention is an information processing apparatus controlling a motion of an object within a virtual space on the basis of a status signal output from a detecting means for detecting a status including at least one of a position and an attitude of an input device, comprises a first motion controlling means for controlling the object such that it performs a first motion within the virtual space on the basis of the status signal, a condition determining means for determining whether or not information relative to a magnitude of the status signal satisfies a predetermined condition, and a second motion controlling means for controlling the object such that it performs a second motion different from the first motion within the virtual space on the basis of the status signal in a case that the condition determining means determines that the information relative to a magnitude of the status signal satisfies a predetermined condition.

In the twelfth invention also, similar to the first invention, it is possible to execute various processing on the basis of a status signal relative to a position and an attitude of the input device.

A thirteenth invention is an information processing method of an information processing apparatus for controlling a motion of an object within a virtual space on the basis of a status signal output from a detecting means for detecting a status including at least one of a position and an attitude of an input device including steps of:(a) controlling the object such that it performs a first motion within the virtual space on the basis of the status signal, (b) determining whether or not information relative to a magnitude of the status signal satisfies a predetermined condition, and (c) controlling the object such that it performs a second motion different from the first motion within the virtual space on the basis of the status signal in a case that the step (b) determines that the information relative to a magnitude of the status signal satisfies a predetermined condition.

In the thirteenth invention also, similar to the first invention, it is possible to execute various processing on the basis of a status signal relative to a position and an attitude of the input device.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view for explaining an external view of the controller connected with the gyro sensor unit shown in FIG. 1 and the gyro sensor unit;

FIG. 17 is an illustrative view for explaining a method of deciding a position and an orientation of a moving object;

FIG. 18 is an illustrative view for explaining a method of deciding a position and an orientation of the moving object;

FIG. 19 is an illustrative view showing an example of a moving velocity and a rotational velocity of the moving object, and a force worked on the moving object;

FIG. 20 is an illustrative view showing another example of a force worked on the moving object;

DETAILED DESCRIPTION OF THE PREFERRED EMBODIMENTS

Figure 1:
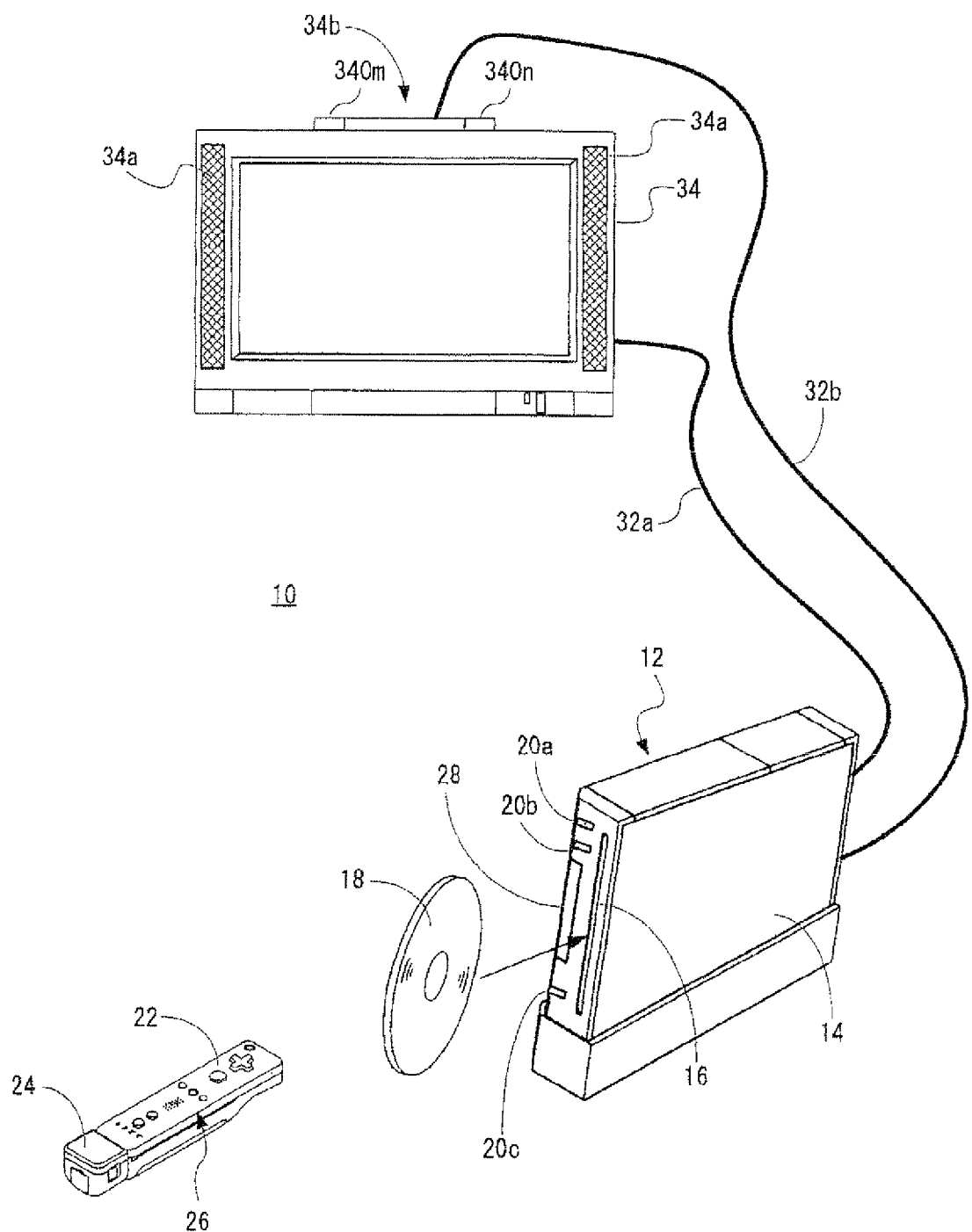
FIG. 1 is an illustrative view showing one embodiment of a game system of the present invention.

Referring to FIG. 1, a game system 10 of one embodiment of the present invention includes a video game apparatus (hereinafter referred to as a "game apparatus") 12 functioning as an information processing apparatus, and a controller 22. Although illustration is omitted, the game apparatus 12 of this embodiment is designed such that it can be connected to four controllers 22 at the maximum. Furthermore, the game apparatus 12 and the respective controllers 22 are connected by a wireless manner. The wireless communication is executed according to a Bluetooth (registered trademark) standard, for example, but may be executed by other standards such as infrared rays, a wireless LAN. In addition, it may be connected by a wire. Furthermore, in this embodiment, the controller 22 is connected (coupled) with a gyro unit 24.

The game apparatus 12 includes a roughly rectangular parallelepiped housing 14, and the housing 14 is furnished with a disk slot 16 on a front surface. An optical disk 18 as one example of an information storage medium storing game program, etc. is inserted through the disk slot 16 to be loaded into a disk drive 54 (see FIG. 2) within the housing 14. Although illustration is omitted, around the disk slot 16, an LED and a light guide plate are arranged such that the LED of the disk slot 16 can light on or off in accordance with various processing.

Furthermore, on the front surface of the housing 14 of the game apparatus 12, a power button 20a and a reset button 20b are provided at the upper part thereof and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory for the internal memory. In addition, in the game apparatus 12, other applications except for the game may be executed, and in such a case, data of the other applications can be stored in the memory card.

Here, a general-purpose SD card can be employed as a memory card, but other general-purpose memory cards, such as memory sticks, a multimedia card (registered trademark) can be employed.

Although omitted in FIG. 1, the game apparatus 12 has an AV cable connector 58 (FIG. 2) on the rear surface of the housing 14, and by utilizing the AV cable connector 58, a monitor 34 and a speaker 34a are connected to the game apparatus 12 through an AV cable 32a. The monitor 34 and the speaker 34a typically are a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound such as a game music, a sound effect, etc. is output from the right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Here, programs of the video game and other applications may be stored (installed) in an internal memory (flash memory 42 (see FIG. 2)) of the game apparatus 12 so as to be executed from the internal memory. In such a case, programs stored in a storage medium like an optical disk 18 may be installed onto the internal memory, or downloaded programs may be installed onto the internal memory.

Figure 2:
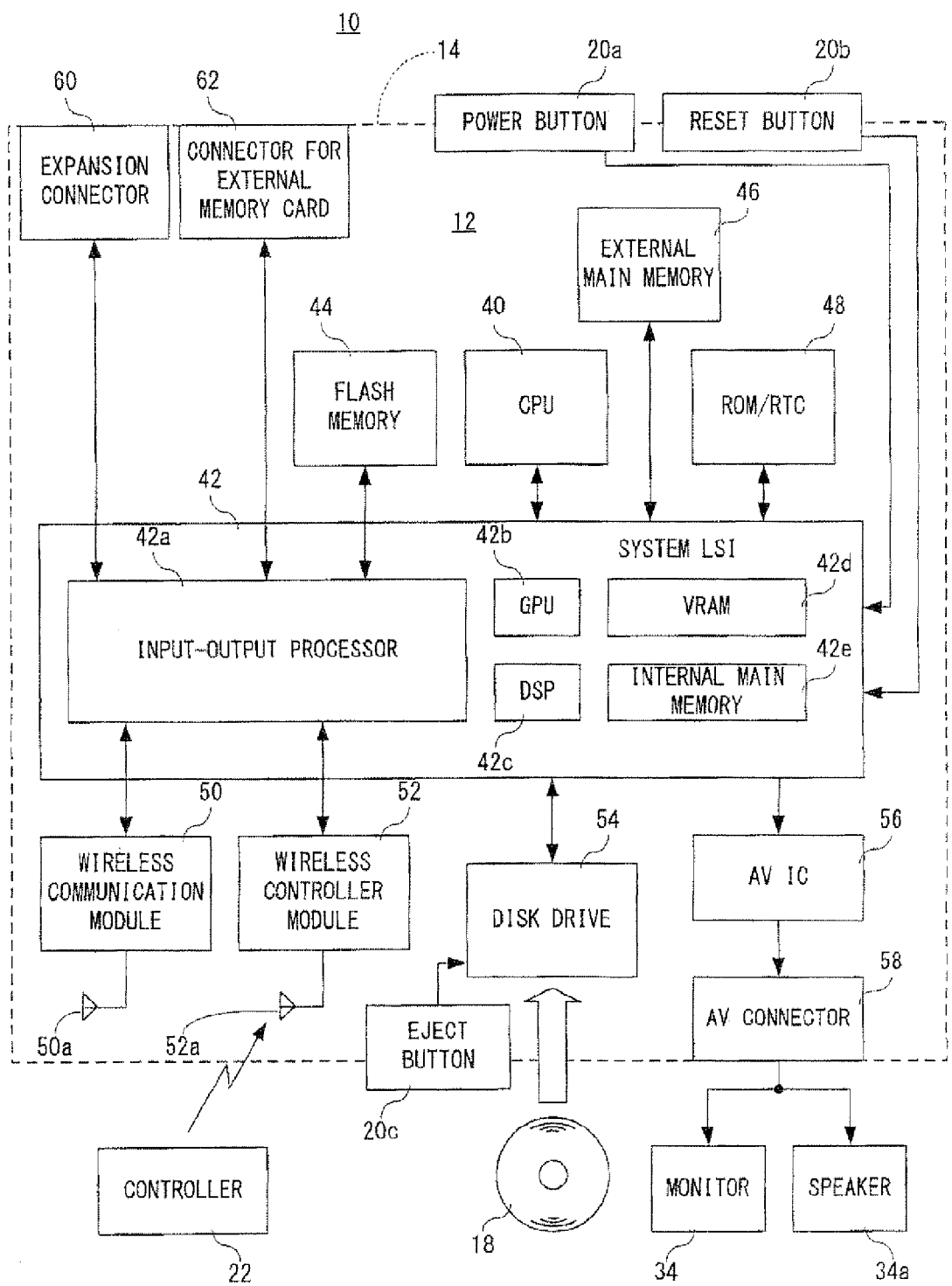
FIG. 2 is a block diagram showing an electric configuration of the game system shown in FIG. 1.

FIG. 2 is a block diagram showing an electric configuration of the video game system 10 in FIG. 1 embodiment. Although illustration is omitted, the respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area or a buffer area of the CPU 40 by storing programs like a game program, etc., and various data. The ROM/RTC 48, the so-called hoot ROM, is incorporated with a program for activating the game apparatus 12, and provided with a time circuit for counting a time. The disk drive 54 reads a program, image data, sound data, etc. from the optical disk 18, and writes them in an internal main memory 42e described later or the external main memory 46 under the control of the CPU 40.

The system LSI 42 is provided with an input-output processor 42a, a CPU (Graphics Processor Unit) 42b, a DSP (Digital Signal Processor) 42c, a VRAM 42d and an internal main memory 42e. These are connected with each other by internal buses although illustration is omitted. The input-output processor (I/O processor) 42a executes transmission and reception of data, downloads of data, and so forth. A detailed description is made later as to transmission and reception and download of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42h is connected with the VRAM 42d as described above. The GPU 42b accesses the VRAM 42d to acquire the data (image data; data such as polygon data, texture data, etc.) required to execute the construction command. Additionally, the CPU 40 writes the image data required for drawing to the VRAM 42d via the CPU 42b. The CPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data which are stored in the internal main memory 42e and the external main memory 46.

The game image data and audio data which are generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50, a wireless controller module 52, an expansion connector 60 and a connector for external memory card 62. The wireless communication module 50 is connected with an antenna 50a, and the wireless controller module 52 is connected with an antenna 52a.

Although illustration is omitted, the input-output processor 42a can communicate with other game apparatuses and various servers to be connected to a network via the wireless communication module 50. It should be noted that it is possible to directly communicate with other game apparatuses without going through the network. The input-output processor 42a periodically accesses the flash memory 44 to detect the presence or absence of data (referred to as transmission data) required to be transmitted to a network, and, in a case that the transmission data is present, transmits it to the network via the wireless communication module 50 and the antenna 50a. Furthermore, the input-output processor 42a receives data (referred to as reception data) transmitted from other game apparatuses via the network, the antenna 50a and the wireless communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42e or the external main memory 46. The input data is erased from the buffer area after being utilized in the processing by the CPU 40 (game processing, for example).

In this embodiment, as described above, the wireless controller module 52 performs a communication with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as another controller different from the controller 22. Furthermore, the expansion connector 60 is connected with a cable LAN adaptor, and can utilize the cable LAN in place of the wireless communication module 50. The connector for external memory card 62 can be connected with an external storage like a memory card. Thus, for example, the input-output processor 42a accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. Then the power button 20a is turned on, the system LSI 42 is set to a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 48, the wireless communication module 50, and the wireless controller module 52. Accordingly, in this embodiment, in the standby mode, the CPU 40 never performs the application.

Although the system LSI 42 is supplied with power even in the standby mode, generation of clocks to the CPU 42b, the DSP42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52a is not performed in the standby mode.

The reset button 20b is also connected to the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Figure 3:
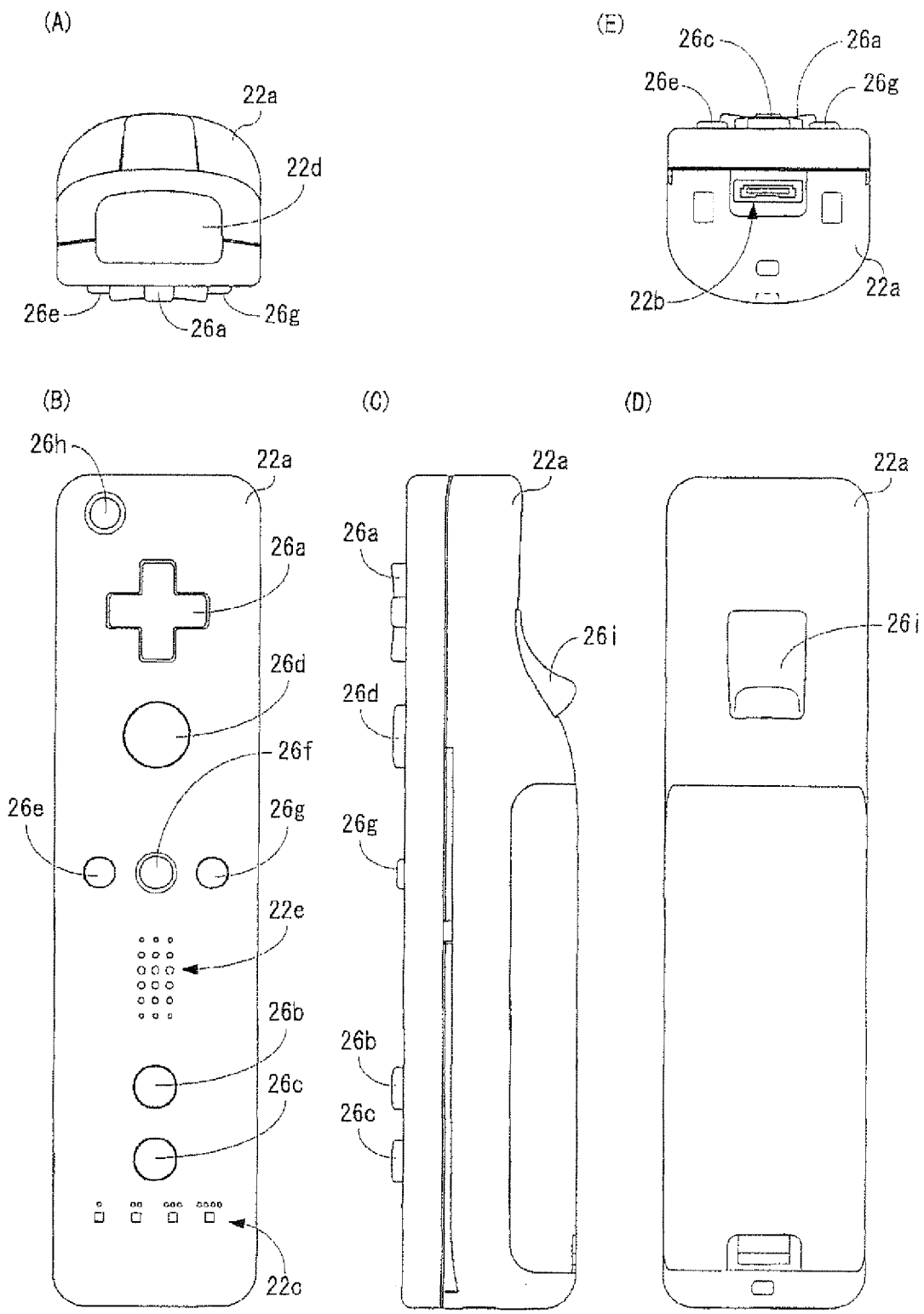
FIG. 3 is an illustrative view explaining an external view of the a controller shown in FIG. 1.

FIG. 3(A) to FIG. 3(E) show one example of an external appearance of the controller 22. FIG. 3(A) shows a leading end surface of the controller 22, FIG. 3(B) shows a top surface of the controller 22, FIG. 3(C) shows a right surface of the controller 22, FIG. 3(D) shows a bottom surface of the controller 22, and FIG. 3(E) shows a trailing end of the controller 22.

Referring to FIG. 3(A) to FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on a top surface of the housing 22a, there are provided a cross key 26a, a 1 button 26b, a 2 button 26c, an A button 26d, a – button 26e, a HOME button 26f, a + button 26g and a power switch 26h. Moreover, as shown in FIG. 3(C) and FIG. 3(D), an inclined surface is formed on a bottom surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) that is operable by a player, instruct the moving direction of a cursor, or merely instruct the direction.

The 1 button 26b and the 2 button 26c are respectively push button switches. They are used for a game operation, such as adjusting a viewpoint position and a viewpoint direction in displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, in a case that the controller 22 is used as a pointing device, the A-button switch 26d is used to instruct a decision of an icon or a button image instructed by a pointer (instruction image) on the game screen. For example, when the icon or the button image is decided, an instruction or a command set in advance corresponding thereto can be input.

The – button 26e, the HOME button 26f, the + button 26g, and the power supply switch 26h are also push button switches. The – button 26e is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting, and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action and the command determined by the A-button 26d.

As shown in FIG. 3(E), an external expansion connector 22b is provided on a trailing end surface of the housing 22a, and as shown in FIG. 3(B), an indicator 22c is provided on the top surface and on the side of the trailing end surface of the housing 22a. The external expansion connector 22b is utilized for connecting another expansion controller not shown other than the controller 22. The indicator 22c is made up of four LEDs, for example. The indicator 22c can show identification information (controller number) of the controller 22 by lighting any one of the four LEDs and according to the lighted LED, and show the remaining amount of the battery of the controller 22 depending on the number of LEDs to be emitted.

In addition, the controller 22 has an imaged information arithmetic section 80 (see FIG. 4), and as shown in FIG. 3(A), a light incident opening 22d of the imaged information arithmetic section 80 is provided on the leading end surface of the housing 22a. Furthermore, the controller 22 has a speaker 86 (see FIG. 4), and the speaker 86 is provided inside the housing 22a at the position corresponding to a sound release hole 22e between the 1 button 26b and the HOME button 26f on the top surface of the housing 22a as shown in FIG. 3(B).

Note that as shown in FIG. 3(A) to FIG. 3(E), the shape of the controller 22 and the shape, number and setting position of each input means 26 are simply examples, and needless to say, even if they are suitably modified, the present invention can be implemented.

FIG. 4(A) is an illustrative view showing a state that the gyro unit 24 is connected to the controller 22 as shown in FIG. 1. The gyro unit 24 is connected to the trailing end surface of the controller 22 (on the side of the indicator 22c). As shown in FIG. 4(B), the gyro unit 24 has a housing 24a formed by plastics molding similar to the controller 22. The housing 24a is a substantially cubic shape, and has an attachment plug 24b to be connected to the external expansion connector 22b of the controller 22 on the side for connection to the controller 22. Furthermore, as shown in FIG. 4(C), on the opposite side to the side where the attachment plug 24b is provided, an external expansion connector 24c is provided.

Figure 5:
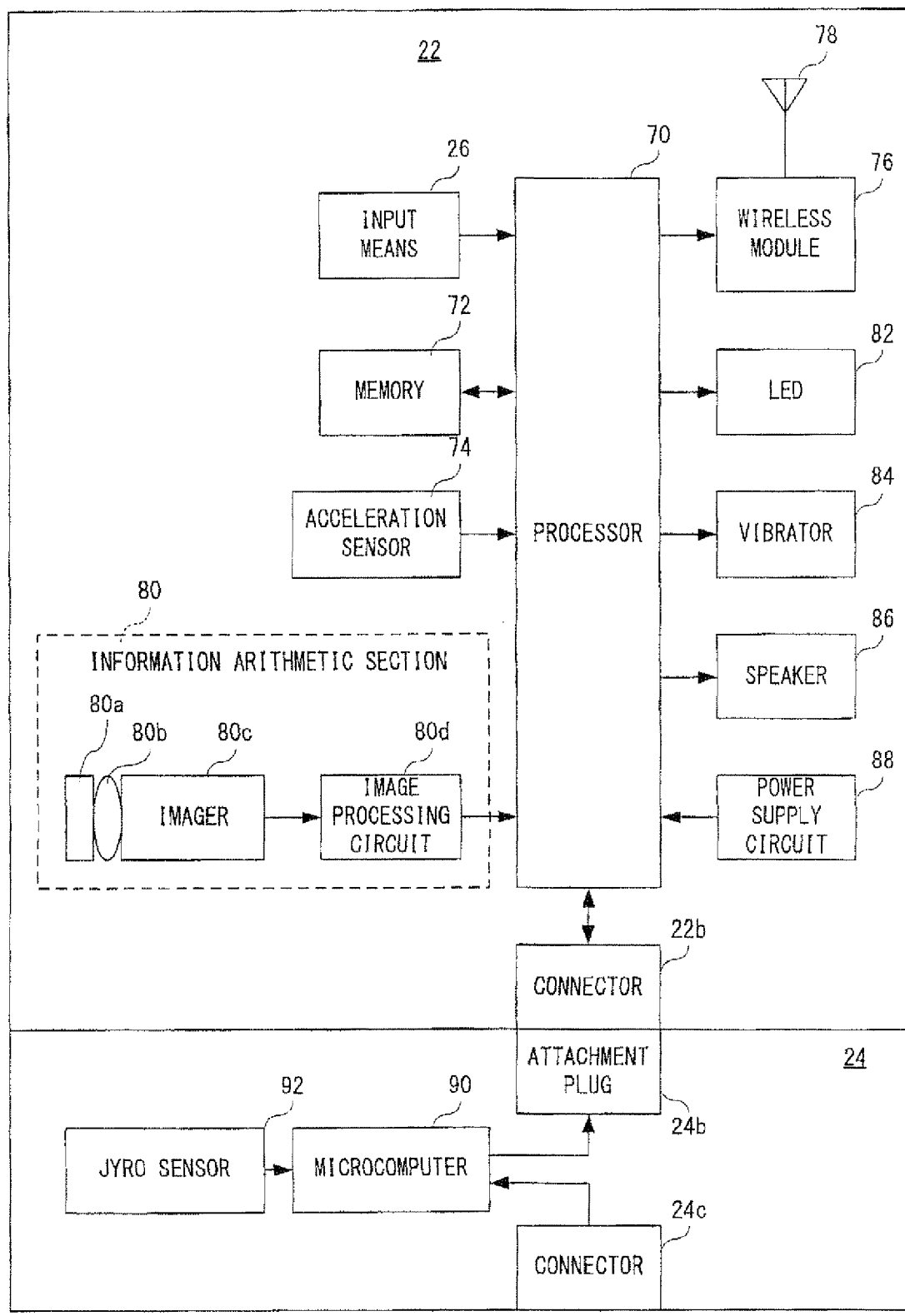
FIG. 5 is a block diagram showing an electric configuration of the controller connected with the gyro sensor unit shown in FIG. 1.

FIG. 5 is a block diagram showing an electric configuration of the controller 22 and the gyro unit 24. Referring to FIG. 5, the controller 22 includes a processor 70, and the processor 70 is connected with the external expansion connector 22b, the input means 26, a memory 72, an acceleration sensor 74, a wireless module 76, the imaged information arithmetic section 80, an LED 82 (the indicator 22c), a vibrator 84, a speaker 86, and a power supply circuit 88 by an internal bus (not shown). Moreover, an antenna 78 is connected to the wireless module 76.

For simplicity, although omitted in FIG. 5, the indicator 22c is made up of the four LEDs 82 as described above.

The processor 70 is in charge of an overall control of the controller 22, and transmits (inputs) information (input information) input by the input means 26, the acceleration sensor 74, and the imaged information arithmetic section 80 as input data to the game apparatus 12 via the wireless module 76 and the antenna 78. At this time, the processor 70 uses the memory 72 as a working area or a buffer area. An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (z-axial direction), lateral direction (y-axial direction), and forward and rearward directions (x-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once.

The processor 70 creates input data including at least one of the operation data, acceleration data, marker coordinate data as described later and angular velocity data as described later, and transmits the input data thus created to the game apparatus 12 for each third predetermined time (5 msec, for example).

In this embodiment, although omitted in FIG. 3(A) to FIG. 3(E), the acceleration sensor 74 is provided inside the housing 22a on the circuit board in the vicinity of where the cross key 26a is arranged.

The wireless module 76 modulates a carrier of a predetermined frequency by the input data, by using a technique of Bluetooth, for example, and emits its weak radio wave signal from the antenna 78. Namely, the input data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application (game processing), following the acquired input data and the application program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights ahead of the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data (marker coordinate data to be described later) for each fourth predetermined time. It should be noted that a description of the process in the image processing circuit 80d is made later.

Furthermore, the controller 22 is connected with the gyro unit 24. As understood from FIG. 5, the separable attachment plug 24b is connected to the external expansion connector 22b. The separable attachment plug 24b is connected with the microcomputer 90 with a signal line. The microcomputer 90 is connected with the gyro sensor 92, and connected with the external expansion connector 24c with a signal line.

The gyro sensor 92 detects angular velocities about three axes of vertical direction (about a z-axial direction), lateral direction (about a y-axial direction), and forward and rearward directions (about an x-axial direction) of the controller 22. Here, a rotation about the Z axis is represented by a yaw angle, a rotation about the Y axis is represented by a pitch angle, and a rotation about the X axis is represented by a roll angle. The gyro sensor 74 can employ a typically piezoelectric vibration type, but may employ other types.

For example, the gyro sensor 92 detects an angular velocity (ωx, ωy, ωz) in relation to each of the X axis, the Y axis, and the Z axis every fourth predetermined time, and inputs the detected angular velocities to the microcomputer 90. Here, when the angular velocities are converted from analog signals to digital data when input to the microcomputer 90. The gyro sensor 92 used in this embodiment can measure an angular velocity relative to each axis in the range from 0 to 1500 dps (degree percent second). In the virtual game of this embodiment described later, the range from 900 to 1500 dps is a range of measure relative to the yaw angle, and the range from 0 to 1500 dps is a range of measure relative to the pitch angle and the roll angle.

The microcomputer 90 detects an angular velocity applied from the gyro sensor 92 every fifth predetermined time, and temporarily stores angular velocity data corresponding to the angular velocity in a memory (not illustrated) included in the microcomputer 90. Then, the microcomputer 90 transmits the angular velocity data temporarily stored in the memory to the controller 22 (processor 70) every sixth predetermined time.

Noted that in this embodiment, the microcomputer 90 temporarily stores the angular velocity data in the memory, and transmits the same in batches to a certain degree to the processor 70, but may directly transmit the angular velocity data to the processor 70 without temporarily storing the same in the memory.

Figure 6:
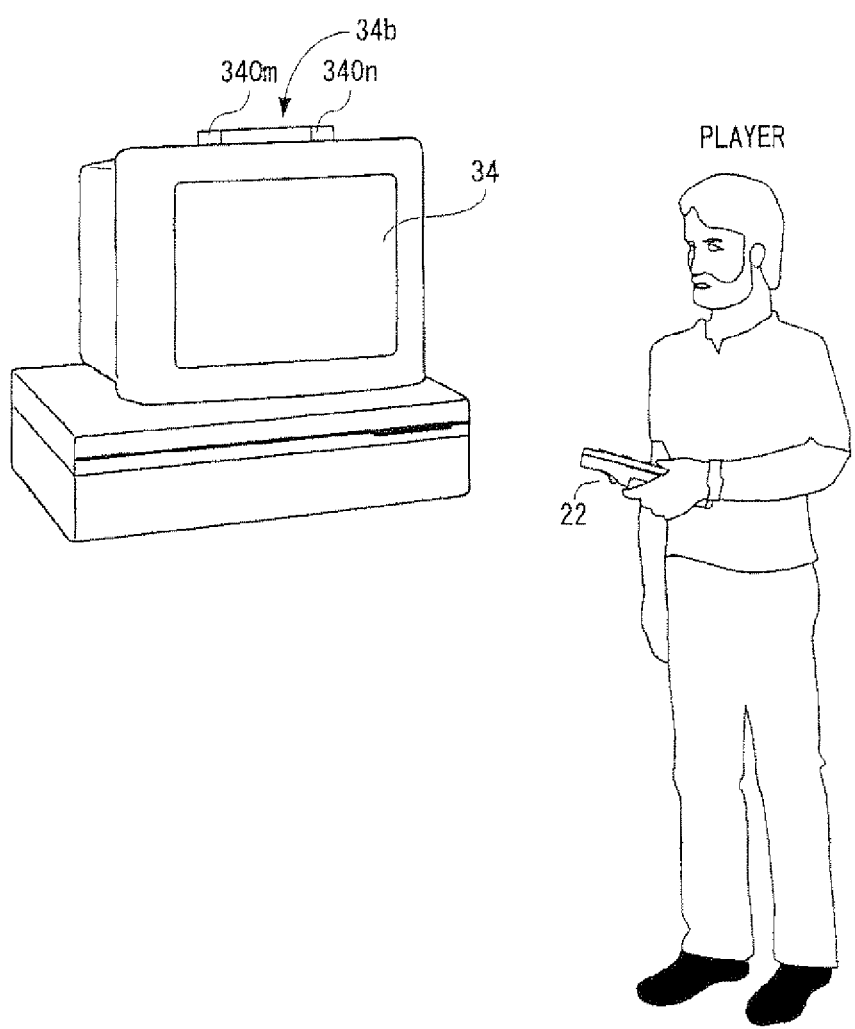
FIG. 6 is an illustrative view for roughly explaining a state that a game is played by using the controller connected with the gyro sensor unit shown in FIG. 1.

FIG. 6 is an illustrative view summarizing a state when a player plays a game by utilizing the controller 22. It should be noted that the same is true for a case that another application is executed as well as a game playing. As shown in FIG. 6, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22, and changing a distance between the controller 22 and each of the markers 340m and 340n.

Noted that although it is difficult to understand in FIG. 6, this is true even if the above-described gyro unit 24 is connected to the controller 22.

Figure 7:
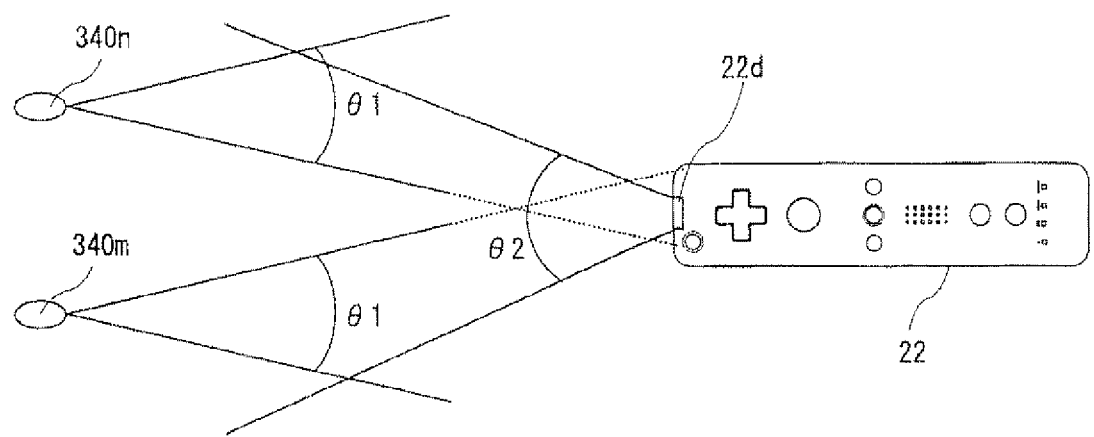
FIG. 7 is an illustrative view for explaining viewing angles of markers and the controller shown in FIG. 1.

FIG. 7 is a view showing viewing angles between the respective markers 340m and 340n, and the controller 22. As shown in FIG. 7, each of the markers 340m and 340n emits infrared ray within a range of a viewing angle $\theta 1$. Also, the imager 80c of the imaged information arithmetic section 80 can receive incident light within the range of the viewing angle $\theta 2$ taking the line of sight of the controller 22 as a center. For example, the viewing angle $\theta 1$ of each of the markers 340m and 340n is 34° (half-value angle) while the viewing angle $\theta 2$ of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle $\theta 2$ of the imager 80c, and the controller 22 exists in at least one of the viewing angles $\theta 1$ of the marker 340m or 340n. In this state, the controller 22 can detect at least one of the markers 340m and 340n. The player can perform a game operation by changing the position and the attitude of the controller 22 in the range satisfying the state.

If the position and the attitude of the controller 22 are out of the range, the game operation based on the position and the attitude of the controller 22 cannot be performed. Hereafter, the above-described range is called an "operable range".

Figure 8:
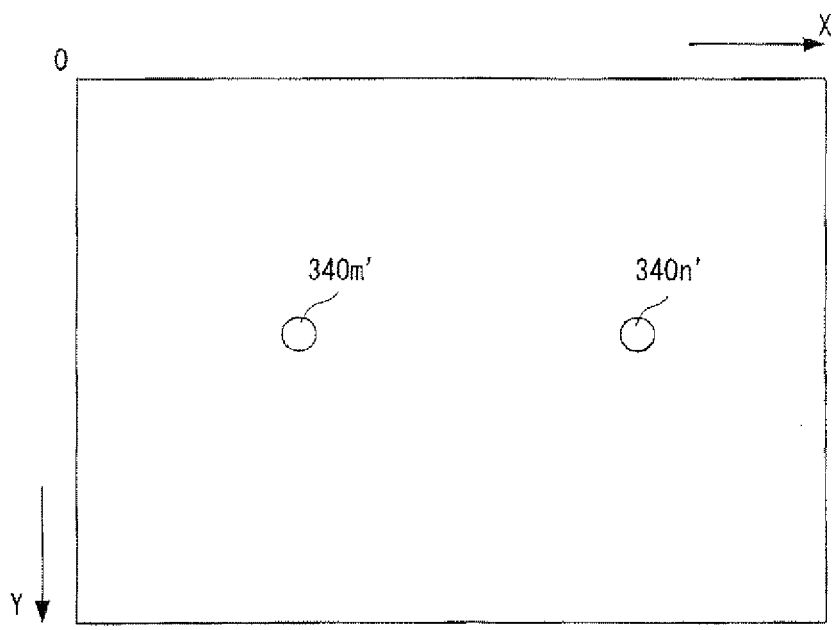
FIG. 8 is an illustrative view showing one example of an imaged image including object images.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 8 is an illustrative view showing one example of the imaged image including the object images. The image processing circuit 80d calculates coordinates (marker coordinates) indicative of the position of each of the markers 340m and 340n in the imaged image by utilizing the image data of the imaged image including the object images.

Since the object image appears as a high-intensity part in the image data of the imaged image, the image processing circuit 80d first detects the high-intensity part as a candidate of the object image. Next, the image processing circuit 80d determines whether or not the high-intensity part is the object image on the basis of the size of the detected high-intensity part. The imaged image may include images other than the object image due to sunlight through a window and light of a fluorescent lamp in the room as well as the images 340m' and 340n' corresponding to the two markers 340m and 340n as an object image. The determination processing whether or not the high-intensity part is an object image is executed for discriminating the images 340m' and 340n' as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination process, and therefore, two marker coordinates are calculated. The image processing circuit 80d outputs data indicative of the calculated two marker coordinates. The data of the output marker coordinates (marker coordinate data) is included in the input data by the processor 70 as described above, and transmitted to the game apparatus 12, The game apparatus 12 (CPU 40) detects the marker coordinate data from the received input data to thereby calculate an instructed position (instructed coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340m and 340n, and therefore, the game apparatus 12 can grasp the distance between the controller 22 and each of the markers 340m and 340n by calculating the distance between the two marker coordinates.

One example of a virtual game utilizing such a game system 10 will be explained with reference to the drawings. In this embodiment, the virtual game is to compete scores by moving a moving object such as a flying disk in a virtual space in accordance with an operation by a player, and making a non player object such as a dog catch the moving object. Here, depending on the way of moving the moving object, the non player object can catch the moving object or cannot catch it, or the score is changed depending on the position where the moving object is caught.

Additionally, if the moving object cannot be caught, or if the moving object can be caught but the position where the moving object is caught is outside the range set in advance, the score is not added.

Figure 9:
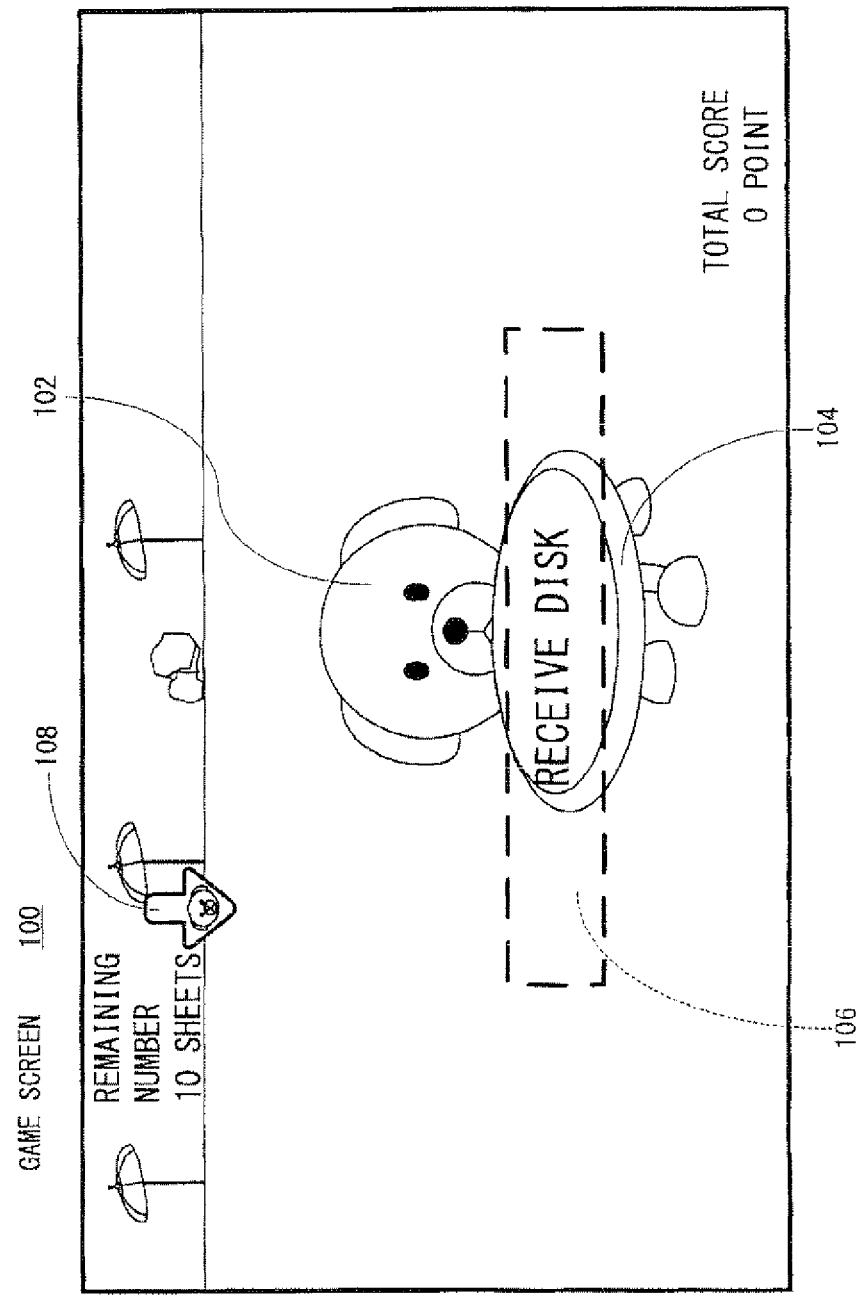
FIG. 9 is an illustrative view showing an example of a first game screen displayed on the monitor shown in FIG. 1.

FIG. 9 is an illustrative view showing one example of a game screen 100 of the above-described virtual game. On the game screen 100 shown in FIG. 9, a dog (non player object) 102 is shown at substantially the center, and this non player object 102 holds the flying disk (moving object) 104 in its mouth. Furthermore, in front of the non player object 102 and the moving object 104, a display area 106 of dotted frame is placed for displaying a message of informing a player or a player object (see FIG. 10) of receiving the moving object 104. In addition, diagonally upward left of the non player object 102, a target object 108 having an arrow shape being a target for which the moving object 104 is thrown (moved) is shown. In addition, at the tight lower part of the game screen 100, a total score is shown.

In this embodiment, when the message is shown on the monitor 34, and then a predetermined button (A button 26d, for example) is pushed (turned on) with an instruction image such as a mouse pointer not shown moved over the display area 106 by an operation of the controller 22, a player object 110 (see FIG. 10) described later receives the moving object 104 from the non player object 102.

The reason why the moving object 104 is received from the non player object 102 is for inducing the player holding the controller 22 connected with the gyro unit 24 to be opposed to the monitor 34, and inducing a position and a direction (attitude) of the controller 22 in the actual space when a throwing action of the moving object 104 is started to take a desired position and a desired orientation. Although a detailed explanation is omitted, the position and the attitude of the controller 22 at this time are decided as a reference position and a reference attitude, and from then on, the position of the moving object 104 within the three-dimensional virtual space is calculated on the basis of the amount of displacement from the reference position, and the orientation of the moving object 104 within the three-dimensional virtual space is calculated on the basis of alteration from the reference orientation until an operation of receiving the moving object 104 from the non player object 102 is executed next.

Here, in a case that a person actually throws a flying disk, the person opposes to the target, and then twists his or her body from the front to the right or left such that the hand or the arm holding the flying disk is wound around the body, and returns his or her body to the front with the hand or arm extended from this state. Thus, in the virtual game of this embodiment a message for inducing a player before performing a throwing action of the flying disk (moving object) 104 to oppose to the target object 108, i.e., the monitor 34 (marker unit 34b) is displayed, and in response to the player clicking it, the moving object 104 is received. More specifically, the player is induced to turn the light incident opening 22d of the controller 22 that he or she holds to the monitor 34 (marker unit 34b).

Noted, in a case of generally throwing a flying disk with the right hand, the person twists his or her body to the left direction while in a case of throwing the flying disk with the left hand, the person twists his or her body to the right direction.

Furthermore, in this embodiment, as described later, the top surface of the controller 22 corresponds to the top surface of the moving object 104, and the attitude (inclination) of the controller 22 is represented as an orientation (inclination) of the moving object 104.

Figure 10:
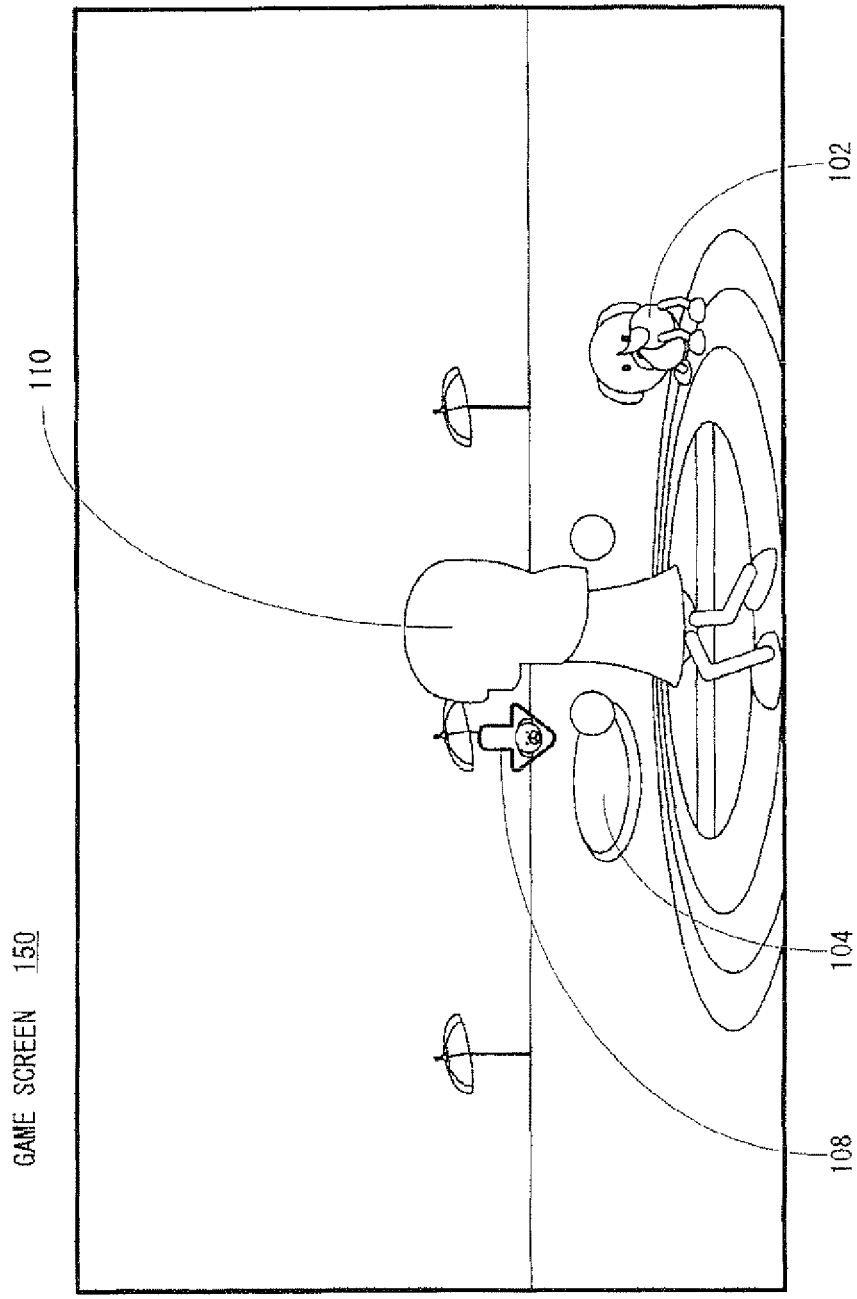
FIG. 10 is an illustrative view showing an example of a second game screen displayed on the monitor shown in FIG. 1.

FIG. 10 is an illustrative view showing an example of another game screen 150. On the game screen 150 shown in FIG. 10, the player object 110 is shown at the lower center of the screen. Furthermore, the player object 110 is in a state that it twists its body to the left in order to throw the moving object 104. Although illustration is omitted, the player holding the controller 22 connected with the gyro unit 24 performs an operation in the same manner. In addition, the target object 108 is shown ahead of the player object 110 and at substantially the center of the game screen 150. Moreover, the non player object 102 is in a state of waiting the start of the movement of the moving object 104 on the right of the player object 110 in order to follow the moving object 104.

Figure 11:
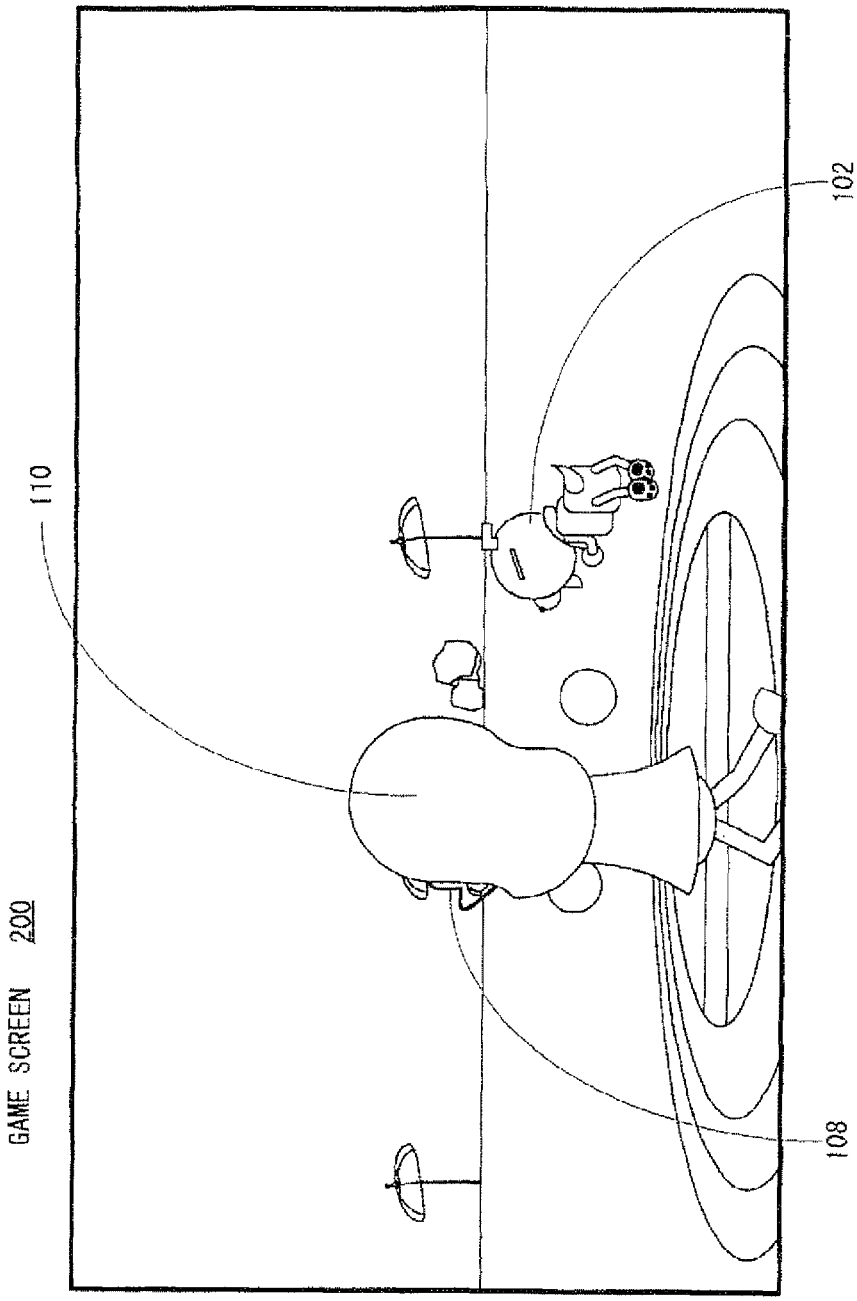
FIG. 11 is an illustrative view showing an example of a third game screen displayed on the monitor shown in FIG. 1.

FIG. 11 is an illustrative view showing an example of another game screen 200. FIG. 11 shows the game screen 200 representing a scene directly after the player object 110 throws the moving object 104. On the game screen 200, the player object 110 is displayed at substantially the lower center, and the target object 108 is displayed so as to be covered with the player object 110. Additionally, the non player object 102 is displayed on the right of the player object 110, and in a state that it starts to follow the moving object 104. Here, in FIG. 11, since the moving object 104 and the player object 110 are overlapped with each other, and the player object 110 is shown above (toward the player), the moving object 104 cannot be viewed. Accordingly, by representing the player object 110 translucently or with the outline of the dotted line only, the moving object 104 may be displayed to be viewed, for example.

Although illustration is omitted, when the player swings his or her hand or arm with the controller 22 connected with the gyro unit 24 held as if he or she actually throws the flying disk, and the change of the angular velocity indicated by the gyro data satisfies a predetermined condition, the moving object 104 within the virtual game space starts to move (fly) as described later.

Although described in detail later, in a case that the moving object 104 moves (flies), various forces, such as gravity set within the virtual space, lift caused by rotations of the moving object 104, air resistance caused by tilts of the moving object 104, etc. work, and therefore, the position and the orientation (inclination) of the moving object 104 are calculated for each interval. Here, the initial velocity to the moving direction of the moving object 104 and the initial velocity of the rotation thereof are detected on the basis of the accelerations detected by the controller 22. The detail is described later.

Figure 12:
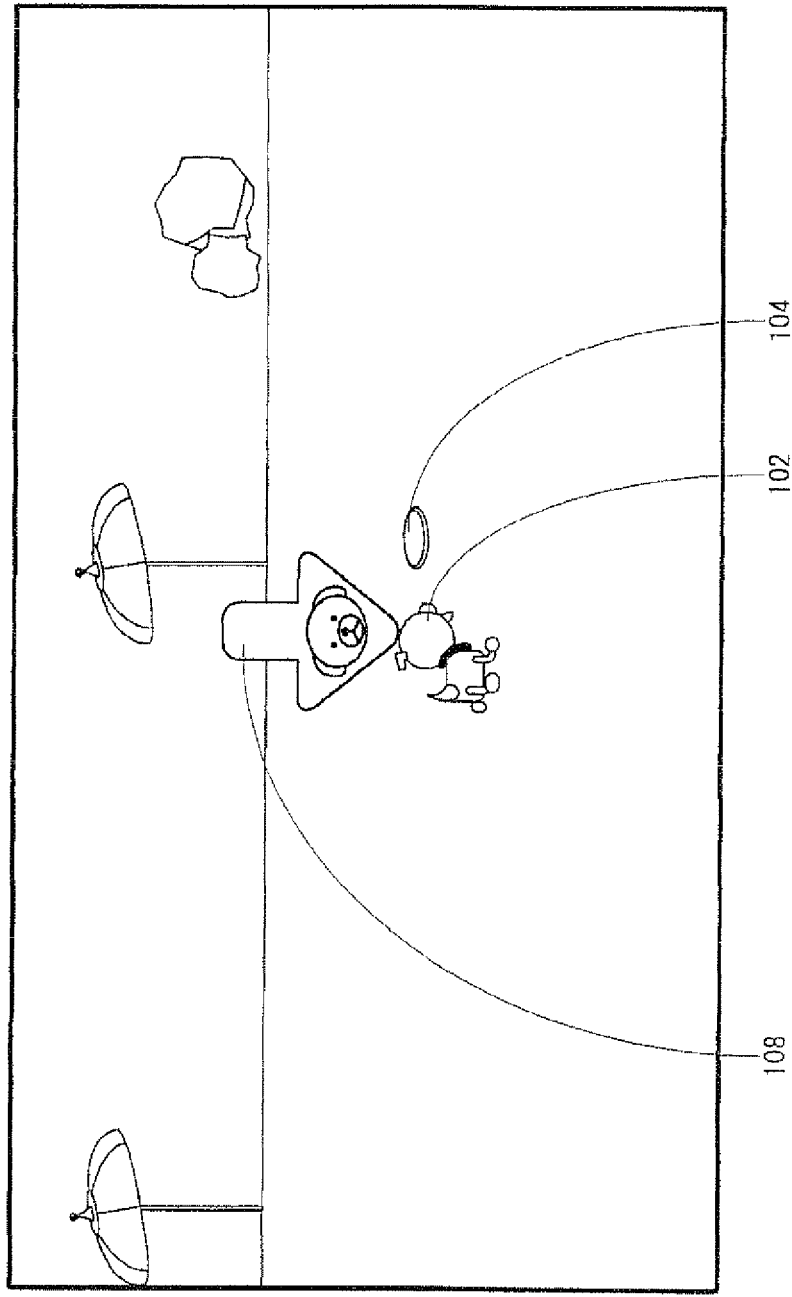
FIG. 12 is an illustrative view showing an example of a fourth game screen displayed on the monitor shown in FIG. 1.

FIG. 12 is an illustrative view showing an example of still another game screen 250. FIG. 12 shows a scene that the moving object 104 thrown by the player object 110 moves close to the target object 108, and the non player object 102 tries to catch the moving object 104. More specifically, on the game screen 250 shown in FIG. 12, the target object 108 is shown at substantially the center, and the moving object 104 is shown at the diagonally downward right from it. In addition, at the lower side of the target object 108, the non player object 102 is shown.

Figure 13:
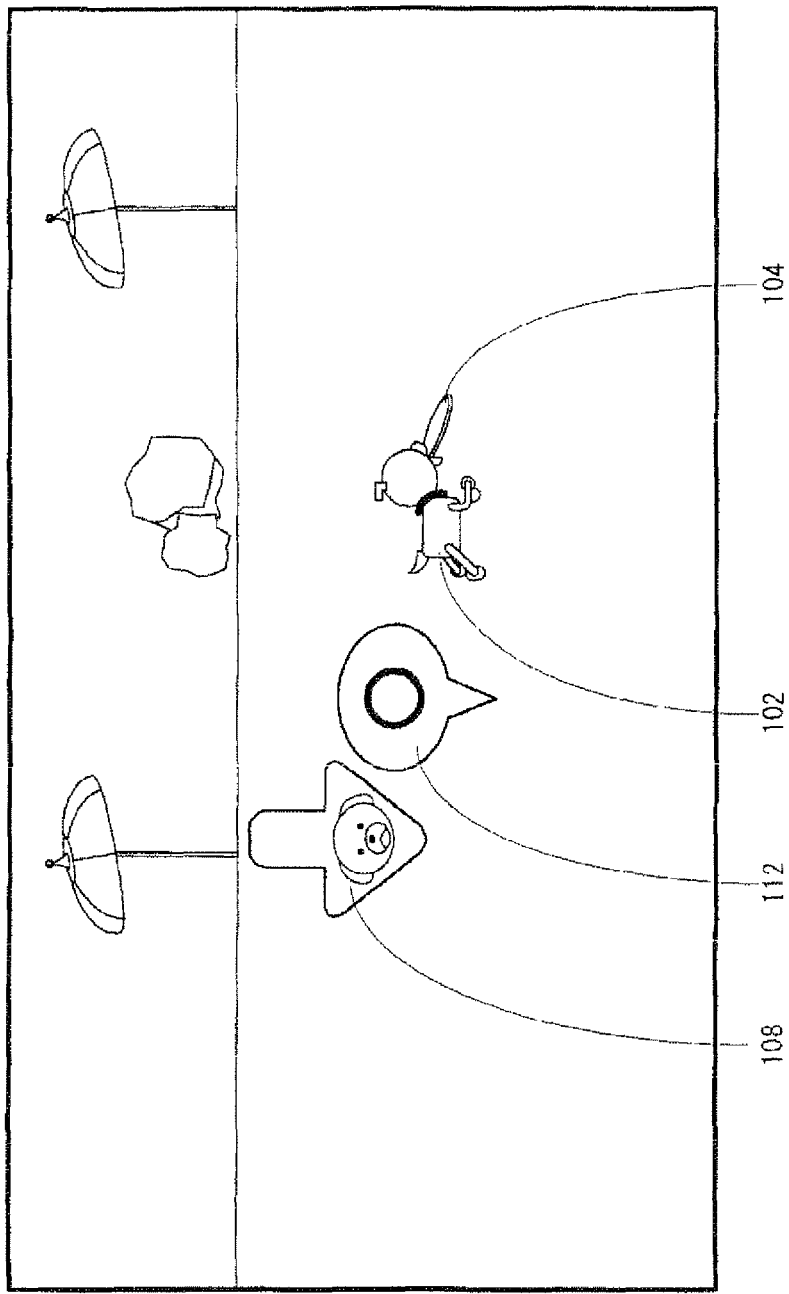
FIG. 13 is an illustrative view showing an example of a fifth game screen displayed on the monitor shown in FIG. 1.

FIG. 13 is an illustrative view showing an example of another game screen 300. FIG. 13 shows a scene directly after the non player object 102 catches the moving object 104 which the player object 110 has thrown. More specifically, on the game screen 300 shown in FIG. 13, the target object 108 is shown to the left from the center, and the non player object 102 holding the moving object 104 in its mouse is shown to the right from the center. Furthermore, at substantially the center of the game screen 300, a marker 112 indicating the position where the non player object 102 catches the moving object 104 is shown.

Figure 14:
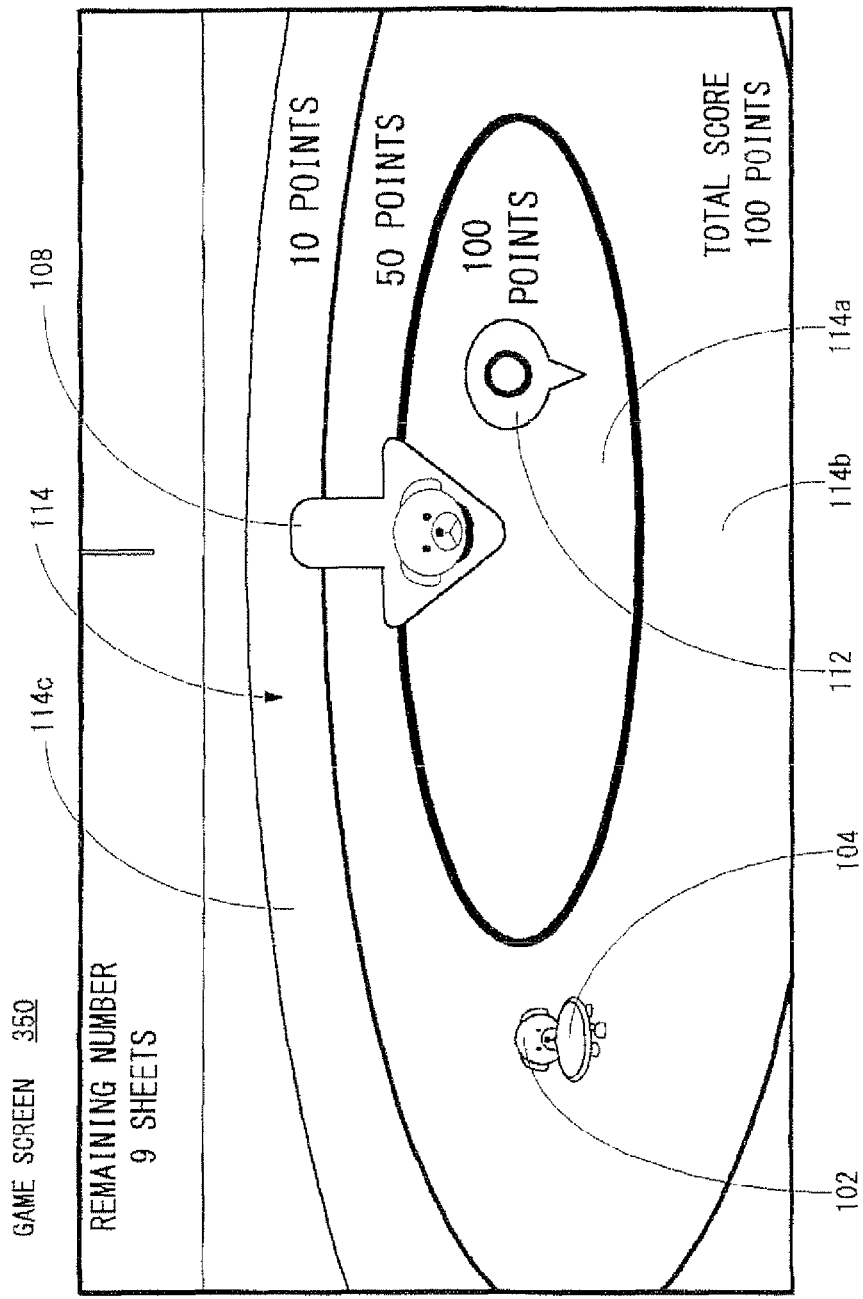
FIG. 14 is an illustrative view showing an example of a sixth game screen displayed on the monitor shown in FIG. 1.

FIG. 14 is an illustrative view showing an example of a further another game screen 350. FIG. 14 shows a scene that a point (score) with respect to the current try is decided. More specifically, the target object 108 is displayed at substantially the center of the game screen 350, and a circular scoring area 114 centered about the target object 108 is displayed. The scoring area 114 is segmented to three areas, and a circular area 114*a* including the target object 108 and donut-shaped areas 114*b*, 114*c* centered about it are provided. The score is set to low as the position where the non player object 102 catches the moving object 104 is far away from the target object 108. In this embodiment, out of the three areas of the scoring area 114, 100 points is assigned to the area 114*a* including the target object 108, 50 points is assigned to the donut-shaped area 114*b* adjacent to the area 114*a*, and 10 points is assigned to the donut-shaped area 114*c* adjacent to the area 114*b*. In FIG. 14 example, the marker 112 is shown within the area 114*a*, this shows that the current point (score) is 100 points.

Here, in a case that the position where the non player object 102 catches the moving object 104 is outside the scoring area 114, no point is added. Although illustration is omitted, a circular or quadrangle area (judging area) slightly larger than the scoring area 114 is set, and in a case that the moving object 104 falls (lands) except for the judging area, the non player object 102 does not catch the moving object 104. That is, the non player object 102 stops following the moving object 104 in the middle, or it moves to the target object 108 without following the moving object 104.

Furthermore, when the moving object 104 is thrown by predetermined number of times (10 times, for example), the game playing is to be ended. The total scores with respect to these tries by the predetermined number of times is competed with that of another player, or is compared with the player's own total score until the last time.

Figure 15:
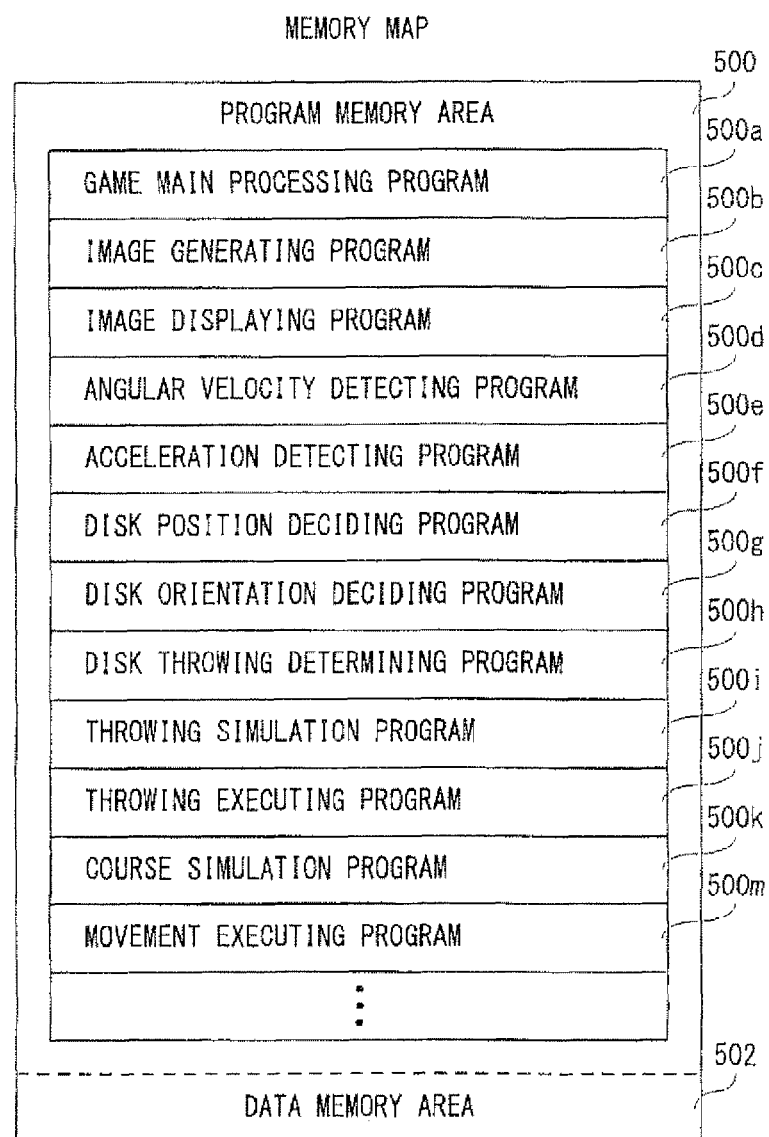
FIG. 15 is an illustrative view showing a memory map of a main memory shown in FIG. 2.
Figure 16:
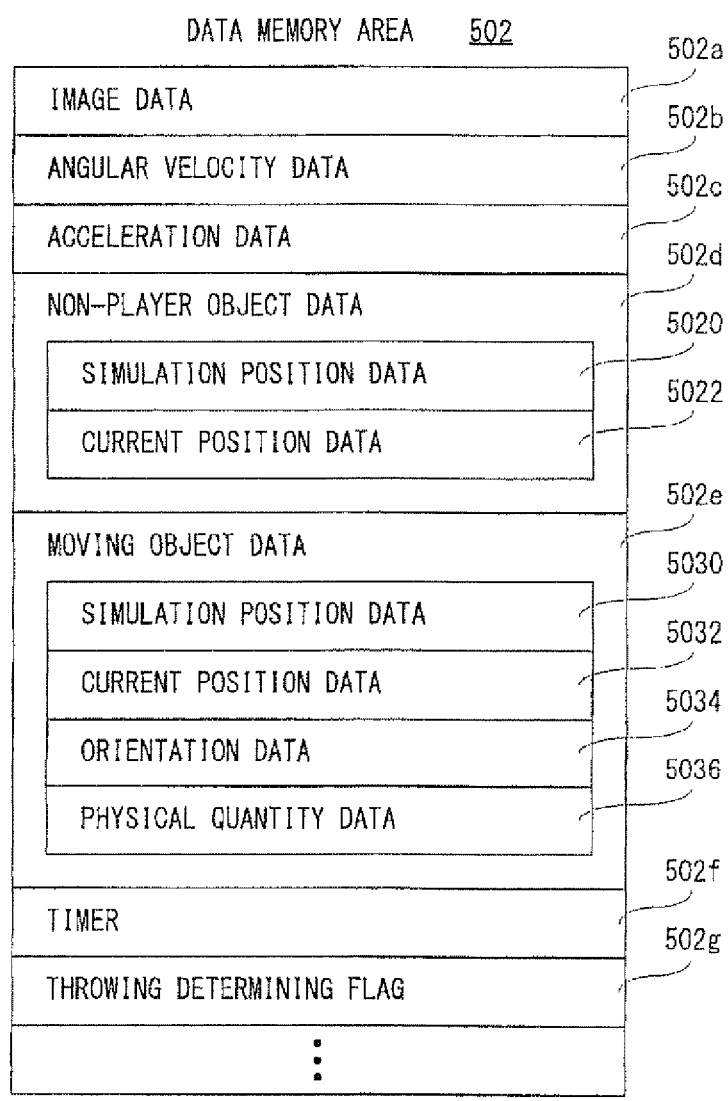
FIG. 16 is an illustrative view showing a concrete example of the data memory area shown in FIG. 15.

FIG. 15 is an illustrative view showing a memory map of the internal main memory 42*e* or the external main memory 46 shown in FIG. 2. As shown in FIG. 15, the main memory (42*e*, 46) includes a program memory area 500 and a data memory area 502. The concrete contents of the data memory area 502 is shown in FIG. 16. The program memory area 500 stores a game program, and the game program is made up of a game main processing program 500*a*, an image generating program 500*b*, an image displaying program 500*c*, an angular velocity detecting program 500*d*, an acceleration detecting program 500*e*, a disk position deciding program 500*f*, a disk orientation deciding program 500*g*, a disk throwing determining program. 500*h*, a throwing simulation program 500*i*, a throwing executing program 500*j*, a course simulation program 500*k*, a movement executing program 500*m*, etc.

The game main processing program 500*a* is a program for processing a main routine of the virtual game of this embodiment. The image generating program 500*b* is a program for generating a game image to display a game screen (100, 150, 200, 250, 300, 350, etc.) on the monitor 34 by using image data 502*a* (see FIG. 16) described later. The image displaying program 500*c* is a program for displaying the game image generated according to the image generating program 500*b* on the monitor 34 as a game screen (100, 150, 200, 250, 300, 350, etc.).

The angular velocity detecting program 500*d* is a program for detecting angular velocity data relative to an angular velocity detected by the gyro sensor 92. As described above, the angular velocity data is included in the input data from the controller 22, and thus, the CPU 40 detects the angular velocity data included in the input data from the controller 22 according to the angular velocity detecting program 500*d*.

The acceleration detecting program 500*e* is a program for detecting acceleration data relative to an acceleration detected by the acceleration sensor 74. As described above, the acceleration data is included in the input data from the controller 22, and thus, the CPU 40 detects the acceleration data included in the input data from the controller 22 according to the acceleration detecting program 500*e*.

The disk position deciding program 500*f* is a program for deciding a position of the moving object 104 within the three-dimensional virtual space. Before the player object 110 throws the moving object 104, the position of the moving object 104 is decided together with the motion of the hand and arm of the player object 110 depending on the angular velocity (yaw angle and pitch angle) detected according to the angular velocity detecting program 500*d* by taking the position of the moving object 104 when the moving object 104 is received from the non player object 102 as a reference.

The disk orientation deciding program 500*g* is a program for deciding an orientation of the moving object 104 within the three-dimensional virtual space. Before the player object 110 throws the moving object 104, the orientation of the moving object 104 depending on the angular velocity detected by the angular velocity detecting program 500*d* is decided. Furthermore, after the player object 110 throws the moving object 104, an orientation corresponding to the position of the moving object 104 changed according to the above-described calculation of physics is decided. Thus, the orientation of the moving object 104, that is, the tilt of the top surface of the moving object 104 is also calculated for each frame (frame is a screen updating rate: 1/60 (seconds)). Here, in this embodiment, the moving object 104 is a flying disk, and a rotational force about the axis perpendicular to the flying disk is only applied, and thus, the orientation of the moving object 104 after it is thrown is scarcely changed. However, if the moving object 104 falls onto the ground or is caught by the non player object 102, the orientation is changed.

As shown in FIG. 17(A), the moving object 104 sets a central point near the breast of the player object 110, and moves on a sphere with a radius R decided depending on the length of the arm of the player object 110, the size of the moving object 104, etc. That is, the line segment (length R) connecting the central point of the sphere and the moving object 104 (central point thereof) is changed depending on the angular velocity (yaw angle and pitch angle) to be detected by the gyro sensor 92. Here, the line segment connecting the reference position and the center of the sphere is the line segment as a reference, and the angle formed with this line segment of the reference is decided on the basis of the yaw angle and the pitch angle. In this embodiment, as shown in FIG. 17(B), an angle α in a vertical direction is decided on the basis of the pitch angle of the angular velocity detected by the gyro sensor 92. Furthermore, as shown in FIG. 18(A), an angle β in a horizontal direction is decided on the basis of the yaw angle of the angular velocity detected by the gyro sensor 92. Here, each of the angle α and the angle β is an angle formed with the line segment of the reference.

Here, as shown in FIG. 17(B), in this embodiment, with respect to the angle α in the vertical direction based on the pitch angle, angles of 45° up and down in relation to the horizontal direction are maximum values by taking the central point of the sphere as a center. This is because a case that the moving object 104 cannot move to the target object 108 is ruled out before the moving object 104 is thrown, and an unconventional image in which the moving object 104 is stuck to the head or the leg of the player object 110 is prevented to be displayed. Similarly, as shown in FIG. 18(A), in this embodiment, with respect to the angle β in the horizontal direction based on the yaw angle, angles of 120° from left to right in relation to the moving direction of the moving object 104 are maximum values by taking the central point of the sphere as a center. This is the values decided in view of angles at which the person twists his or her body when the person actually throws a flying disk.

Each of FIG. 17(A) and FIG. 17(B) shows one example of the drawing when seeing, from rear (back surface) of the player object 110, the player object 110 holding the moving object 104 in the right hand twisting its upper body to the left. FIG. 18(A) shows a drawing (top view) when seeing the player object 110 from above, and it shows that the player object 110 twists the upper body to the left similar to FIG. 17(A) and FIG. 17(B).

Furthermore, after the player object 110 throws the moving object 104, the position and the orientation of the moving object 104 are decided on the basis of the initial velocity to the moving direction of the moving object 104 calculated when the moving object 104 is thrown, the gravity, the air resistance, and the lift. That is, the general calculation of physics is performed. Here, the moving direction of the moving object 104 is decided by the orientation (inclination) of the moving object 104 which is decided by the roll angle and the pitch angle of the controller 22 when it is determined that the player object 110 throws the moving object 104. Here, the orientation of the moving object 104 means the inclination with respect to the moving direction in the right and left directions and forward and backward directions.

Next, the orientation of the moving object is explained in detail. Before the player object 110 holds the moving object 104 and throws it, the orientation of the moving object 104 is changed according to the movement of the arm of the player object 110.

Here, as described above, the position of the moving object 104 is also changed according to the movement of the arm of the player object 110.

First, when in the state in FIG. 17(B), the player object 110 moves the arm holding the moving object 104 up and down, for example, the surface of the moving object 104 with respect to the horizontal plane is inclined according thereto. More specifically, the orientation of the moving object 104 when the player object 110 receives the moving object 104 from the non player object 102 shall be the state that the top surface and the horizontal plane are parallel with each other, and by taking this state as a reference orientation, the orientation of the moving object 104 is changed according to the pitch angle. That is, when the arm of the player object 110 moves along the sphere with the radius R, the player object 110 remains to catch the moving object 104, so that the orientation of the moving object 104 is changed according to this movement. Accordingly, when the player object 110 moves the arm up, the top surface of the moving object 104 is changed in orientation such that it turns to the side of the head of the player object 110, and on the contrary thereto, when the player object 110 moves the arm down, the bottom surface of the moving object 104 is changed in orientation such that it turns to the side of the foot of the player object 110. That is, the player object 110 moves the arm up and down according to the pitch angle, and this changes the orientation of the moving object 104.

Furthermore, when the player object 110 rotates the wrist of the arm holding the moving object 104 in the state in FIG. 17(B), the inclination (orientation) of the moving object 104 is changed about the axis in the longitudinal (lengthwise) direction of the arm. That is, as shown in FIG. 18(B), the player object 110 rotates the wrist by the rotation angle γ according to the roll angle, to thereby change the orientation of the moving object 104.

It should be noted that FIG. 18(B) is a drawing (side view) when seeing the player object 110 shown in FIG. 17(A) and FIG. 17(B) from a side.

Although detailed explanation is omitted, after the player object 110 throws the moving object 104, the orientation of the moving object 104 during moving scarcely changes as described above.

Furthermore, an initial velocity v, to the moving direction of the moving object 104 shown in FIG. 19(A) is calculated (decided) on the basis of the acceleration detected by the acceleration sensor 74 of the controller 22 when it is determined that the player object 110 throws the moving object 104. More specifically, as shown in FIG. 17(A), FIG. 17(B) and FIG. 18(A), the moving direction is decided to be a tangential direction on the sphere with the radius R taking the part of the breast of the player object 110 as a center, and the magnitude of the moving velocity is decided to be square of the magnitude of the resultant vector combining the three-axis acceleration vectors (ax, ay, az).

Noted that in this embodiment, the initial velocity of the moving object 104 is decided on the basis of the acceleration detected by the acceleration sensor 74 of the controller 22, but it is not restricted thereto. This can be decided on the basis of the angular velocity detected by the gyro sensor 92.

For example, the initial velocity is calculated by multiplying the magnitude of the resultant vector between the vector of the angular velocity in the yaw angle direction and the vector obtained by multiplying the angular velocity in the pitch angle direction by 0.65 times, by a predetermined coefficient.

Furthermore, according to another example, the initial velocity is calculated by multiplying the magnitude of the resultant vector among the vector of the angular velocity in the yaw angle direction, the vector obtained by multiplying the magnitude of the angular velocity in the pitch angle direction by 0.65 times, and the vector obtained by multiplying the angular velocity in the role angle direction by 0.3 times, by a predetermined coefficient.

It should be noted that the predetermined coefficient is a numerical value for making the numerical value of the magnitude (2.6-4.5) of the resultant vector calculated by any one of the above-described processes fall within the numerical values (0.01625 m/f-0.0235 m/f) useable for the game processing. Here, m means a meter, and f means a frame.

In addition, the initial velocity $v_b$ of the rotational velocity of the moving object 104 shown in FIG. 19(A) is calculated (set) to a value ($k(k \leq 1)$ times, for example) in proportion to the initial velocity $v_a$ toward the moving direction of the moving object 104. Here, in a case that the player object 110 twists the body to the left and then throws the moving object 104, the rotation direction of the moving object 104 is a right direction (clockwise), and in a case that the player object 110 twists the body to the right and then throws the moving object 104, it is a left direction (counterclockwise).

Although illustration is omitted, at the beginning of the moving object 104 being thrown, the moving object 104 starts to move, keeping the orientation (inclination) of the moving object 104 directly before it is thrown. That is, the direction of the top surface of the moving object 104 is decided.

Thereafter, forces, such as gravity, air resistance, lift, etc. are worked on the moving object 104, and exert an influence on the moving course of the thrown moving object 104. First, as a force worked in a horizontal direction of the moving object 104, air resistance is enumerated. As shown in FIG. 19(B) and FIG. 19(C), the air resistance is decided depending on the size of the area of the figure of the top surface (or lower surface) formed in the vertical plane when seen from the side of the moving direction of the moving object 104. More specifically, in the example shown in FIG. 19(B), the moving object 104 is tilted by angle p forwardly to the moving direction, and the top surface of the moving object 104 is subject to the air resistance. The magnitude of the air resistance is decided on the basis of the oval area shown in FIG. 19(C).

Next, there are gravity and lift as forces which work in a vertical direction of the moving object 104. As shown in FIG. 20(A), the gravity is a force based on the gravitational acceleration set within the three-dimensional virtual space, and works in a vertically below as to the moving object 104. Furthermore, as shown in FIG. 20(B), the lift, which is a force occurring by rotating the moving object 104 and for making the moving object 104 float up, is in parallel with the rotation axis of the moving object 104, and works in a direction from the bottom surface of the moving object 104 to the top surface thereof. Accordingly, in a case that the moving object 104 is inclined relative to the moving direction, the moving object 104 moves so as to turn to the inclined side.

Although illustration is omitted, when the moving object 104 moves just above the ground, the lift may occur due to the buildup of the pressure (ground effect) with the ground in addition to the rotation. In such a case, lift due to the ground effect also works, and therefore, the moving object 104 moves as if it hops. The same thing happens if the moving object 104 moves just above the water, for example, and in such a case, lift due to a water surface effect occurs.

Returning to FIG. 15, the disk throwing determining program 500h is a program for determining whether or not the flying disk, that is, the moving object 104 is to be thrown. In this embodiment, the angular velocity data detected according to the angular velocity detecting program 500d is data relative to a predetermined number of angular velocities (20, for example), and an extreme is detected on the basis of the predetermined number of angular velocities, and if the extreme is less than a predetermined value (threshold value), it is determined that there is an operation of throwing the moving object 104. However, if the extreme cannot be detected on the basis of the predetermined number of angular velocities or if the detected extreme is equal to or more than the threshold value, it is determined there is no operation of throwing the moving object 104.

The reason why the extreme of the change of the angular velocity is required to determine whether or not the moving object 104 is to be thrown is that the player object 110 (player) twists the body to right or left as described above once when throwing the moving object 104.

Here, in this embodiment, whether or not the moving object 104 is thrown is determined when an extreme is calculated by using the predetermined number of angular velocities, and if the calculated extreme is below the predetermined threshold value, but it is not restricted thereto. For example, if the angular velocity is below the predetermined threshold value, it may be determined that the moving object 104 is thrown. In such a case, the angular velocity is not required to be stored by the predetermined number.

The throwing simulation program 500i is a program for simulating the moving course of the moving object 104 when it is determined that the player object 110 throws the moving object 104. For example, the position of the moving object 104 (three-dimensional coordinate) for each frame is evaluated by calculation of physics as described above. Furthermore, the orientation of the moving object 104 corresponding to the position evaluated by the calculation of physics is decided. This is because the non player object 102 is moved so as to follow the moving object 104.

The throwing executing program 500j is a program for calculating the moving course of the moving object 104 in a case that it is determined the player object 110 throws the moving object 104, and movingly displaying the moving object 104 according thereto. This throwing executing program 500j is substantially the same as the throwing simulation program 500i, but it draws the moving object 104 at the orientation decided for each frame at the three-dimensional position calculated for each frame. Accordingly, a scene in which the moving object 104 moves (flies) is displayed on the monitor 34 as a game screen.

The course simulation program 500k is a program for simulating the route that the non player object 102 moves. In this embodiment, as described above, the non player object 102 moves so as to follow the moving object 104. However, if the moving object 104 is greatly displaced from the scoring area 114, the non player object 102 does not follow the moving object 104, and in such a case, the route is decided in the following manner.

The non player object 102 moves a distance to a certain extent so as to substantially go straight ahead the target object 108, and then moves to follow the current position of the moving object 104. For example, when the non player object 102 goes a distance to a certain extent, an arbitrary Bezier curve connecting two points of the current position of the moving object 104 and a position where the moving object 104 falls calculated according to the throwing simulation program 500i is calculated. Then, a position (three-dimensional coordinate) for each frame is calculated so as to move the non player object 102 on the calculated Bezier curve.

The movement executing program 500m is a program for updating the three-dimensional position such that the non player object 102 moves on the route calculated according to the course simulation program 500k, and drawing the non player object 102 at the updated three-dimensional position. Here, since it is constructed to follow the moving object 104, and catch the moving object 104, the course calculated according to the course simulation program 500k is evenly divided by the number of frames just before the moving object 104 falls onto the ground to thereby decide a three-dimensional position for each frame. Furthermore, the movement executing program 500m generates a game image such that the non player object 102 catches the moving object 104 at a position where the non player object 102 and the moving object 104 are overlapped with each other. Here, in this embodiment, since the dog as a non player object 102 catches the flying disk as a moving object 104 in the mouth, the non player object 102 and the moving object 104 are overlapped with each other just before the moving object 104 falls onto the ground as described above.

Furthermore, in this embodiment, in order to represent the try being unsuccessful, in a case that the position where the moving object 104 falls is outside the scoring area 114, even if the non player object 102 follows close to the moving object 104, the moving object 104 does not catch it. However, this is one example, and even in such a case, the non player object 102 may catch the moving object 104.

Although illustration is omitted, the game program also includes a sound output program, a backup program, etc. The sound output program is a program for outputting sound necessary for the game, such as music (BGM), a voice or an onomatopoeic sound of an object, a sound effect, and the like by utilizing sound (music) data. The backup program is a program for saving (storing) game data (proceeding data, result data) in the memory card.

In addition, as shown in FIG. 16, the data memory area 502 stores image data 502a, angular velocity data 502b, acceleration data 502c, non-player object data 502d and moving object data 502e. Furthermore, to the data memory area 502, a timer 502f and a throwing determining flag 502g are provided.

The image data 502a is image data for generating a game image, and includes polygon data, texture data, etc. The angular velocity data 502b is angular velocity data detected according to the angular velocity detecting program 500d. As described above, since whether or not the non player object 102 throws the moving object 104 is determined on the basis of the angular velocity data 502b, data relative to at least predetermined number of angular velocities (20, for example) are temporarily stored in the data memory area 502. Here, in this embodiment, three or four angular velocity data are detected for each frame. The acceleration data 502c is acceleration data detected according to the acceleration detecting program 500c.

The non-player object data 502d is data relative to the non player object 102, and includes simulation position data 5020 and current position data 5022. The simulation position data 5020 is three-dimensional coordinate data relative to the non player object 102 for each frame calculated according to the course simulation program 500k. Furthermore, the current position data 5022 is three-dimensional coordinate data relative to the current frame of the non player object 102.

The moving object data 502e is data relative to the moving object 104, and includes simulation position data 5030, current position data 5032, orientation data 5034 and physical quantity data 5036. The simulation position data 5030 is three-dimensional coordinate data of the moving object 104 for each frame calculated according to the throwing simulation program 500i. The current position data 5032 is three-dimensional coordinate data of the moving object 104 at the current frame. The orientation data 5034 is data relative to the orientation (inclination) of the moving object 106 at the current frame. The physical quantity data 5036 is data relative to gravity, air resistance, lift by rotations and lift by a planar effect which are worked on the moving object 104 at the current frame.

The timer 502f is a timer for counting a time taken from when the moving object 104 is thrown to the time when it falls. This timer 502f is reset (count value=0) and started when the moving object 104 is thrown, adding one to the count value for each frame.

The throwing determining flag 502g is a flag for determining whether or not the player object 110 is to throw the moving object 104, and formed by one bit register, for example, when the throwing determining flag 502g is turned on (established), a data value "1" is set to the register, and when the throwing determining flag 502g is turned off (not established), a data value "0" is set to the register. Here, the turning on and off the throwing determining flag 502g is executed according to the disk throwing determining program 500h. More specifically, in a case that it is determined that the player object 110 throws the moving object 104, the throwing determining flag 502g is turned on while if it is determined that the player object 110 does not throw the moving object 104, the throwing determining flag 502g is turned off.

Although illustration is omitted, in the data memory area 502, other data such as sound data, score data, etc., are stored, and other timers (counters) and other flags necessary for the game are also provided.

Figure 21:
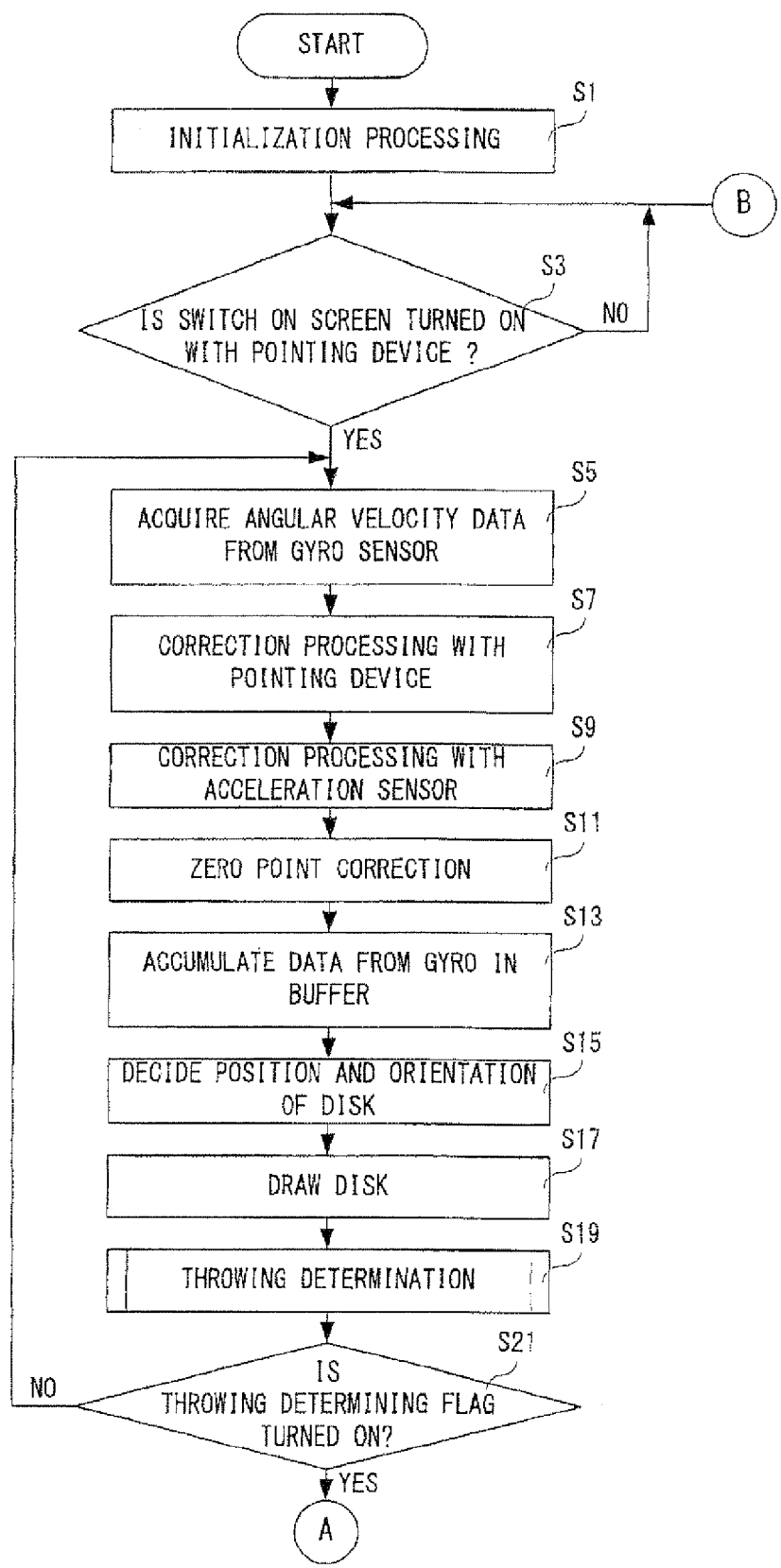
FIG. 21 is a flowchart showing a part of the entire process by the CPU shown in FIG. 2.
Figure 22:
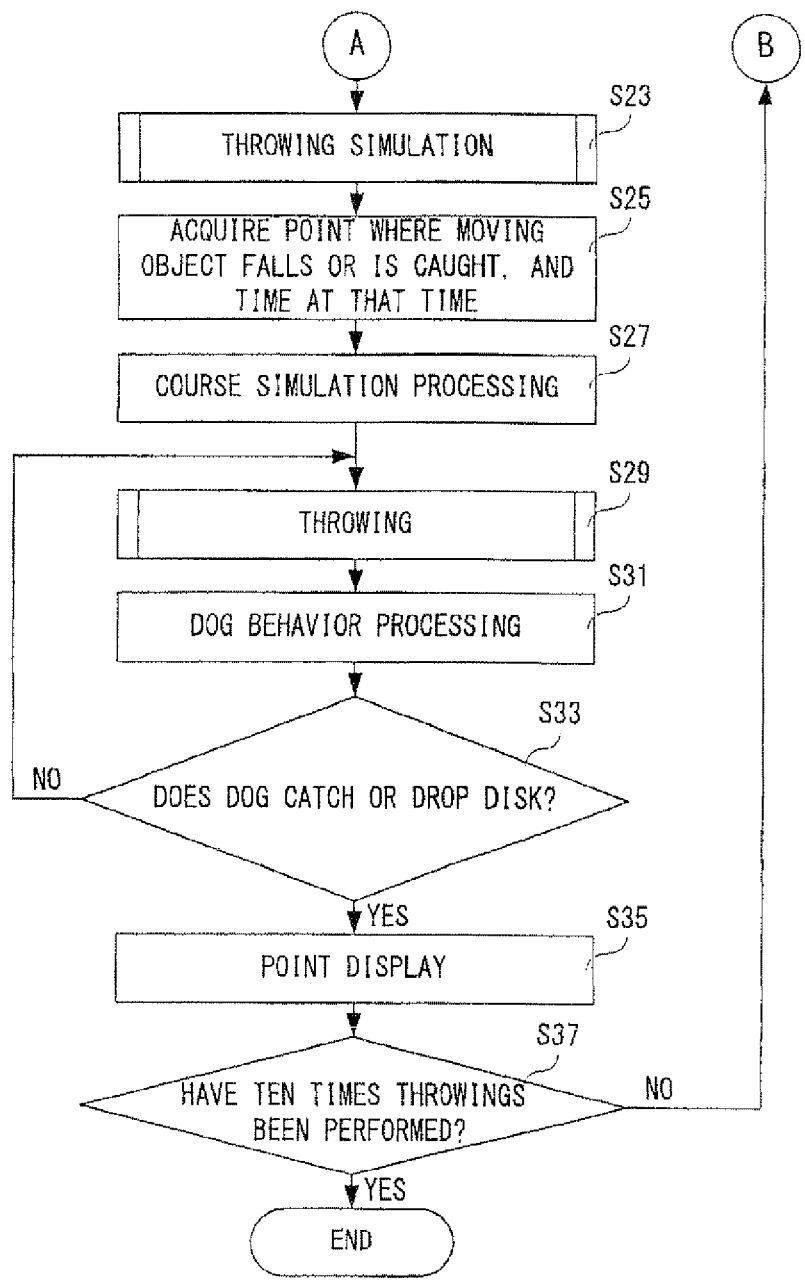
FIG. 22 is a flowchart being another part of the entire process by the CPU shown in FIG. 2, and a sequel to FIG. 21.

More specifically, the CPU 40 shown in FIG. 2 executes entire processing shown in FIG. 21 and FIG. 22. As shown in FIG. 21, when starting the entire processing, the CPU 40 executes initialization processing in a step S1. Here, the CPU 40 generates a game image to display the game screen 100 shown in FIG. 9, clears the angular velocity data 502b and acceleration data 502c, and so forth.

In a next step S3, it is determined whether or not a switch on the screen is pushed by the pointing device. The CPU 40 determines whether or not the player moves an instruction image and clicks the display area 106 of the game screen 100 by utilizing the controller 22. The reason why such processing is executed is for that the position and attitude of the controller 22 in the real space are set to a desired position and a desired attitude, and the position and orientation of the moving object 104 in the three-dimensional virtual space are set to a desired position and a desired orientation as described above. That is, the initialization of the position and orientation of the moving object 104 in the three-dimensional virtual space is performed.

If "NO" in the step S3, that is, if the switch on the screen is not turned on by the pointing device, the process returns to the same step S3. On the other hand, if "YES" in the step S3, that is, if the switch on the screen is turned on with the pointing device, angular velocity data is acquired from the gyro sensor 92 in a step S5. That is, the CPU 40 detects angular velocity data included in the input data from the controller 22.

In a succeeding step S7, correction processing with the pointing device is executed. Briefly speaking, the images of the respective markers 340m and 340n are imaged by the imaged information arithmetic section 80 as described above. The image processing circuit 80d calculates marker coordinates indicating the positions of the images 340m' and 340n' of the markers 340m and 340n in the entire imaged image. Although omitted in the above description, the image processing circuit 80d applies the imaged image data and the marker coordinate data to the processor 70. Accordingly, the input data further includes imaged image data. Then, the CPU 40 determines the attitude (status within the three-dimensional virtual space) of the controller 22 that the player holds from the marker coordinates of the images 340m', 340n' and the positional relationship between the images 340m', 340n', and corrects the angular velocity data detected from the gyro sensor 92 if there is a displacement with the attitude of the controller 22 determined on the basis of the angular velocity data from the gyro sensor 92. More specifically, the yaw angle is corrected based on the marker coordinates (positions) of the images 340m', 340n', and the roll angle is corrected from the positional relationship with the images 340m', 340n'.

In a next step S9, correction processing by the acceleration sensor 74 is executed. Briefly explained, the attitude of the controller 22 is determined on the basis of the acceleration data from the acceleration sensor 74, and corrects the angular velocity data detected by the gyro sensor 92 when there is a displacement with the attitude of the controller 22 determined on the basis of the angular velocity data from the gyro sensor 92. Here, in a case that a game operation is performed with utilizing the controller 22, the accelerations except for the gravitational acceleration are added. As the magnitude of the acceleration indicated by the acceleration data detected by the acceleration sensor 74 is close to the magnitude of the gravitational acceleration, the direction of the acceleration indicated by the acceleration data is more corrected to the direction of the gravitational acceleration. As it is far away from the magnitude of the gravitational acceleration, the direction of the acceleration indicated by the acceleration data is less corrected, and if it is far away from the magnitude of gravitational acceleration above a predetermined magnitude, no correction is made.

Successively, in a step S11 zero-point correcting processing is executed. Here, a displacement of the zero point on the basis of the temperature drift of the gyro sensor 92 is corrected. For example, when it is found that the controller 22 is static on the basis of the acceleration data from the acceleration sensor 74, in a case that the controller 22 moves by the angular velocity data from the gyro sensor 92, it is possible to determine that a displacement occurs at the zero point. More specifically, in a case that the controller 22 is static in the horizontal state, an acceleration vertically below the z axis which is the same or approximately the same in magnitude as the gravitational acceleration is detected. That is, in a case that an acceleration the same or approximately the same in magnitude as the gravitational acceleration is detected on the basis of the acceleration data, it is possible to determine that the controller 22 is static. When it is determined that a displacement occurs at the zero point, a correction is performed such that the angular velocity data at the current time approaches zero.

In a next step S13, the data from the gyro is accumulated in the buffer. That is, the CPU 40 sequentially stores (temporarily stores) the angular velocity data acquired in the step S5 in the data memory area 502. Here, in a case that the correcting processing is performed in the steps S7, S9, S11, the corrected angular velocity data is stored. In a succeeding step S15, the position and orientation of the flying disk, that is, the moving object 104 are decided. That is, the current three-dimensional position is decided (calculated) according to the yaw angle and pitch angle which are indicated by the angular velocity data from the gyro sensor 92 so as to move on the sphere with the radius R by taking the three-dimensional position of the moving object 104 at a time when the moving object 104 is received from the non player object 102 as a reference.

Furthermore, the orientation (inclination) of the moving object 104 is also decided according to the roll angle, yaw angle and pitch angle which are indicated by the angular velocity data from the gyro sensor 92. More specifically, the orientation of the moving object 104 when the player object 110 receives the moving object 104 from the non player object 102 is a state that the top surface of the moving object 104 and a horizontal level are parallel with each other. When the arm of the player object 110 moves along the sphere with the radius R according to the pitch angle by taking this state as a reference orientation, the position of the moving object 104 is changed in a state that the player object 110 holds the moving object 104. Accordingly, when the player object 110 moves the arm up, the orientation is changed such that the top surface of the moving object 104 turns to the head of the player object 110. On the contrary when the player object 110 moves the arm down, the bottom surface of the moving object 104 is changed so as to turn to the foot of the player object 110. That is, moving the arm of the player object 110 up and down according to the pitch angle represents the change in the orientation of the moving object 104. Furthermore, rotating the wrist of the player object 110 according to the roll angle represents the change ill the orientation of the moving object 104.

In a succeeding step S17, the flying disk, that is, the moving object 104 is drawn. Here, the moving object 104 is arranged (drawn) at the position decided in the step S15 at the decided orientation. Successively, in a step S19, throwing determining processing (see FIG. 23) described later is executed, and in a step S21, it is determined whether or not the throwing determining flag 502g is turned on. If "NO" in the step S21, that is, if the throwing determining flag 502g is turned off, the process directly returns to the step S5 to update the motion of the player object 110 and the position and orientation of the moving object 104 that the player object 110 holds on the basis of the angular velocity data from the controller 22. On the other hand, if "YES" in the step S21, that is, if the throwing determining flag 502g is turned on, the process proceeds to a step S23 shown in FIG. 22.

As shown in FIG. 22, in the step S23, throwing simulation processing (see FIG. 24) described later is executed. That is, a moving course of the moving object 104 after the player object 110 throws the moving object 104 on the basis of the operation by the player is evaluated according to the simulation. Although illustration is omitted, when the throwing simulation processing is started, the timer 502f is reset and started. In a succeeding step S25, a three-dimensional position where the moving object 104 falls or the moving object 104 is caught is acquired, and the time at that time is also acquired. Here, the time means a time from when the player object 110 throws the moving object 104 to a time when it falls onto the ground or it is caught by the non player object 102.

Here, in this embodiment, in a case that the point where the moving object 104 falls is within the Judging area, when it is determined that the non player object 102 catches the moving object 104.

In a succeeding step S27, course simulation processing is executed. As described above, in a case that the non player object 102 catches the moving object 104, that is, if the moving object 104 falls within the judging area, the non player object 102 goes straight ahead the target object 108 to a certain extent, and then moves so as to follow the moving object 104. The CPU 40 decides such a moving course, uniformly divides the decided course with the time (the number of frames) acquired in the step S25, and acquires a three-dimensional position for each frame. The data of the three-dimensional position for each frame is simulation position data 5020.

When the course simulation processing is executed, throwing processing (see FIG. 25) described later is executed in a step S29. That is, a game image in which the moving object 104 is moved in the three-dimensional virtual space is generated to display the same on the game screen (200, 250, 300, etc.). In a succeeding step S31, dog behavior processing is executed. That is, the CPU 40 moves the non player object 102 according to the simulation position data 5020 acquired in the step S27. Furthermore, the CPU 40 animation-displays the non player object 102 so as to catch the moving object 104 at a timing when the moving object 104 is to be caught.

Noted that since it is possible to know that the moving object 104 is dropped on is caught in what frame according to the throwing simulation in advance, this can show the time when the moving object 104 is to be caught.

Then, in a step S33, it is determined whether the dog catches the flying disk or drops it. That is, it is determined whether the moving object 104 is caught by the non player object 102, or the moving object 104 falls onto the ground without being caught by the non player object 102 and then suspends the movement.

Here, as described later, in this embodiment, when the moving velocity $v_a$ of the moving object 104 is 0, or when the moving object 104 hits the ground by a predetermined number of times (500 times, for example), it is determined that the moving object 104 falls onto the ground. Here, the hitting determination between the moving object 104 and the ground is performed for each frame.

If "NO" in the step S33, that is, if the dog neither catches nor drops the flying disk, the process directly returns to the step S29. On the other hand, if "YES" in the step S33, that is, if the dog catches the flying disk or drops the same, a point display is executed in a step S35. Here, in a case that the non player object 102 catches the moving object 104, the point corresponding to the position where the non player object 102 catches the moving object 104 (scoring area 114(114a-114c)) is displayed, and in a case that the non player object 102 does not catch the moving object 104, 0 point is displayed.

Then, in a step S37, it is determined whether or not 10 times throwings are made. If "NO" in the step S37, that is, if 10 times throwings have not been performed, it is determined that a next try is performed, and the process returns to the step S3 shown in FIG. 21. On the other hand, if "YES" in the step S37, that is, if 10 times throwings have been performed, the entire process is directly ended.

Figure 23:
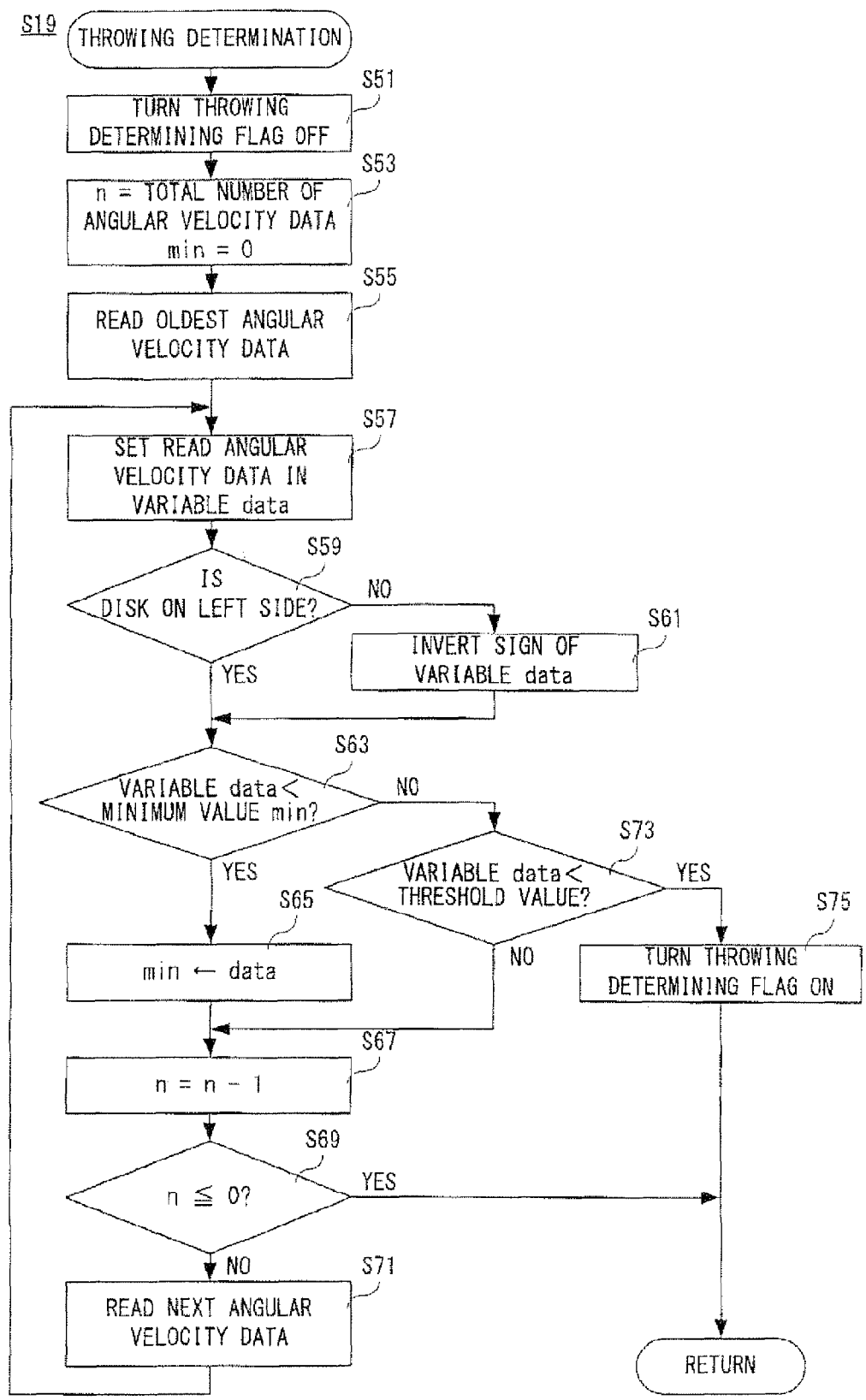
FIG. 23 is a flowchart showing throwing determining processing by the CPU shown in FIG. 2.

FIG. 23 shows a flowchart of the throwing determining processing in the step S19 shown in FIG. 21. As shown in FIG. 23, when starting the throwing determining processing, the CPU 40 turns the throwing determining flag 502g off in a step S51. In a next step S53, the total number of the angular velocity data 502b within the buffer is set in a variable n, and an initial value "0" is set to a minimum value min. Here, the variable n is the number of angular velocity data 502b stored in the data memory area 502. Furthermore, the minimum value min is a minimum value of the angular velocities of the yaw angle indicated by the angular velocity data 502b. Successively, in a step S55, the oldest angular velocity data is read. That is, out of the angular velocity data 502b stored in the data memory area 502, the oldest angular velocity data 502b is read. Then, in a step S57, the angular velocity of the yaw angle indicated by the read angular velocity data 502b is set to the variable data.

In a following step S59, it is determined whether or not the flying disk is on the left side. That is, it is determined whether or not the position of the moving object 104 decided in the step S 8 5 is on the left side as seeing the target object 108 from the player object 110. More specifically, it is determined whether or not an angle formed between a vector extending from the center of the player object 110 to the left direction and a vector extending from the center of the player object 110 to the center of the moving object 104 is less than 90 angles.

If "YES" in the step S59, that is, if the flying disk is on the left side, the process directly proceeds to a step S63. On the other hand, if "NO" in the step S59, that is, if the flying disk is on the right side, the sign of the variable data is inverted in a step S61, and the process proceeds to the step S63. The reason why the processing in the step S61 is executed is that the processing after the step S63 is made equal between a case that the flying disk (moving object 104) is on the left side of the player object 110 and a case that it is on the right side thereof.

It is determined whether or not the variable data is less than the minimum value min in the step S63. If "NO" in the step S63, that is, if the variable data is equal to or more than the minimum value min, the process proceeds to a step S73. On the other hand, if "YE S" in the step S63, that is, if the variable data is less than the minimum value min, the variable data is set to the minimum value min in a step S65, that is, the minimum value min is updated, and the variable n is decremented (n=n−1) in a step S67. In a next step S69, it is determined whether or not the variable n is equal to or less than 0. That is, it is determined whether or not the processing is performed on all the angular velocity data stored in the buffer.

If "YES" in the step S69, that is, if the variable n is equal to or less than 0, the process returns to the entire process shown in FIG. 21 and FIG. 22. On the other hand, if "NO" in the step S69, that is, if the variable n is larger than 0, next (next older) angular velocity data 502b is read in a step S71, and the process returns to the step S57.

In addition, in the step S73, it is determined whether or not the variable data is less than a threshold value. The threshold value, here, is a value for determining whether or not the player performs a throwing operation of the moving object 104 by utilizing the controller 22 and is empirically obtained by experiments, or the like. If "NO" in the step S73, that is, if the variable data is equal to or more than the threshold value, it is determined that this is not a throwing operation, and the process proceeds to the step S67. On the other hand, if "YES" in the step S73, that is, if the variable data is less than the threshold value, the throwing determining flag 502g is turned on in a step S75, and the process returns to the entire process.

Figure 24:
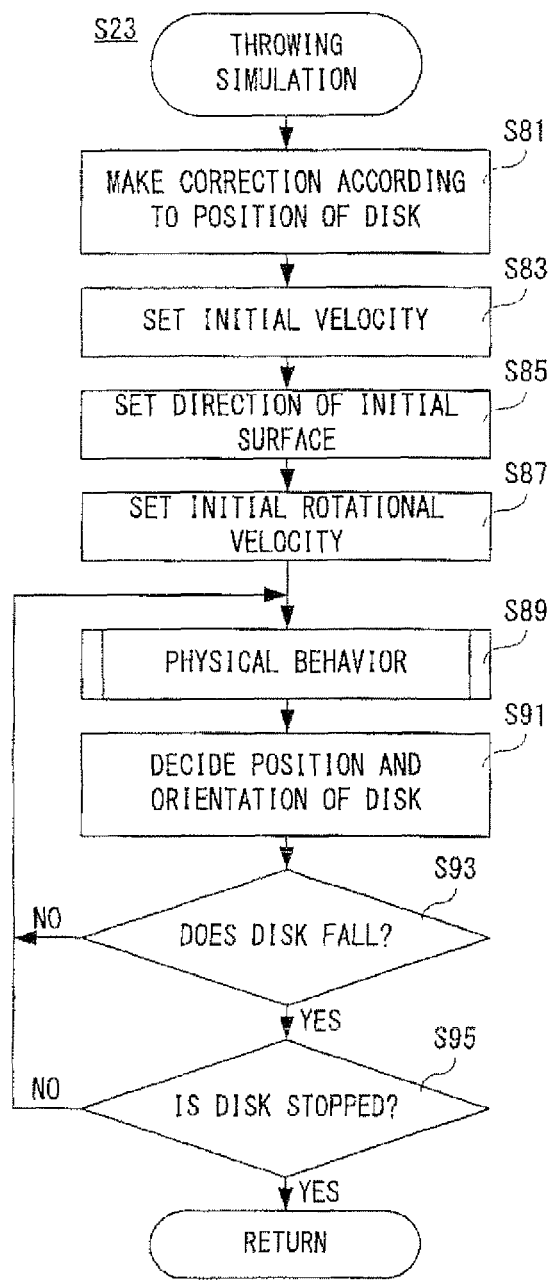
FIG. 24 is a flowchart showing throwing simulation processing by the CPU shown in FIG. 2.

FIG. 24 is a flowchart showing the throwing simulation processing in the step S23 shown in FIG. 22. As shown in FIG. 24, when starting the throwing simulation processing, the CPU 40 makes a correction according to the position of the disk in a step S81. When it is determined that the moving object 104 is to be thrown by the throwing determining processing, the starting time of the movement of the moving object 104 is corrected, or the moving direction is corrected. More specifically, in a case that the moving object 104 is on the back side (opposite to the target object 108) from the immediately lateral position of the player object 110, the starting time of movement is delayed. Furthermore, in a case that the position where the player object 110 throws the moving object 104 is on the front side from the immediately lateral position by a fixed length or more, a first direction of the initial velocity of the moving velocity $v_a$ of the moving object 104 is modified such that the moving object 104 starts to move at a preset angle.

In a succeeding step SS3, the initial velocity of the moving velocity $v_a$ is set. As described above, the direction of the initial velocity of the moving velocity $v_a$ is a tangential direction on the sphere with the radius R, and the magnitude is decided by squaring the magnitude of the resultant vector of the accelerations in the three-axis directions indicated by the acceleration data which is detected by the acceleration sensor 74. In a succeeding step S85, a direction of the initial surface is set. That is, a first orientation of the moving object 104 is set. This is decided according to the angular velocities as to the roll angle and pitch angle which are detected by the angular velocity sensor 92 as described above. Then, in a step S87, an initial rotational velocity $v_b$ is set. As described above, the initial rotational velocity $v_b$ is a value proportional to the initial velocity of the moving velocity $v_a$.

Then, in a step S89, physical behavior processing (see FIG. 26) described later is executed, and in a step S91, a position and an orientation of the flying disk are decided, and in a step S93, it is determined whether or not the flying disk falls. Here, it is determined whether or not the moving object 104 hits the ground (land).

If "NO" in the step S93, that is, if it is determined the flying disk does not fall, the process returns to the step S89. On the other hand, if "YES" in the step S93, that is, if it is determined that the flying disk falls, it is determined whether or not the flying disk is stopped in a step S95. It is determined whether or not the moving velocity $v_a$ of the moving object 104 becomes 0, or whether or not the number of hits of the moving object 104 against the ground is above predetermined number of times (500 times). Here, the number of hits of the moving object 104 against the ground is counted by the counter not shown.

If "NO" in the step S95, that is, if the flying disk is not stopped, the process returns to the step S89. On the other hand, if "YES" in the step S95, that is, if the flying disk is stopped, the process returns to the entire process shown in FIG. 21 and FIG. 22.

Figure 25:
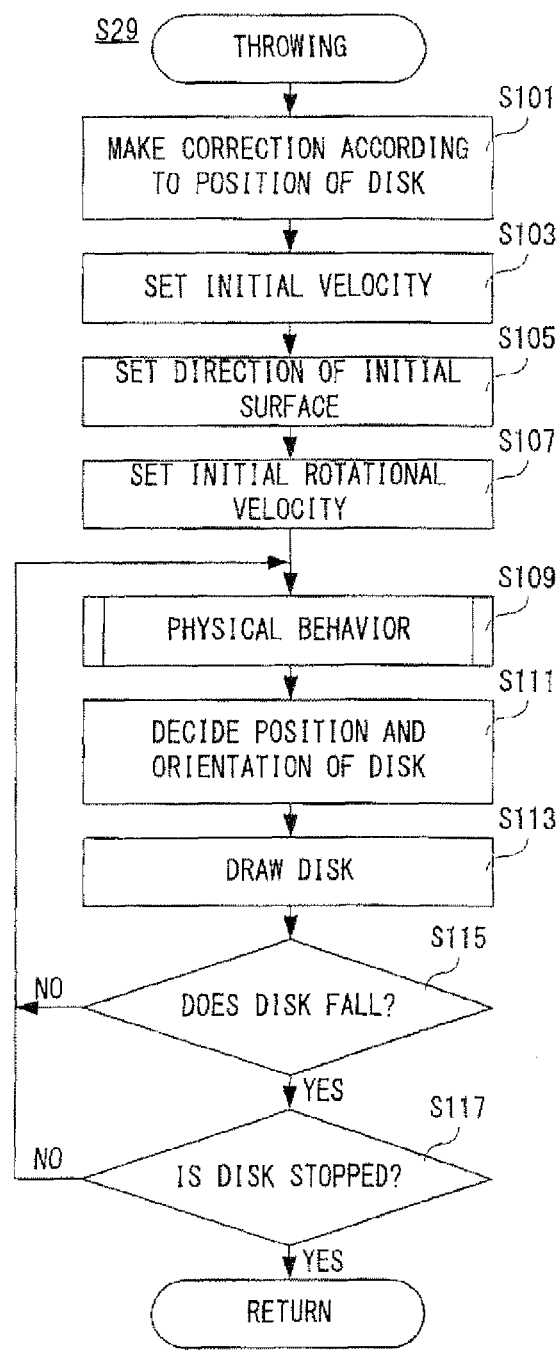
FIG. 25 is a flowchart showing throwing processing by the CPU shown in FIG. 2.

FIG. 25 is a flowchart showing the throwing processing in the step S29 shown in FIG. 22. This throwing processing is the same as the throwing simulation processing shown in FIG. 24 except for that after the position and orientation of the disk are decided, processing (disk drawing processing (S113)) of actually drawing the disk (moving object 104) is executed, and therefore, a duplicated explanation is omitted.

Figure 26:
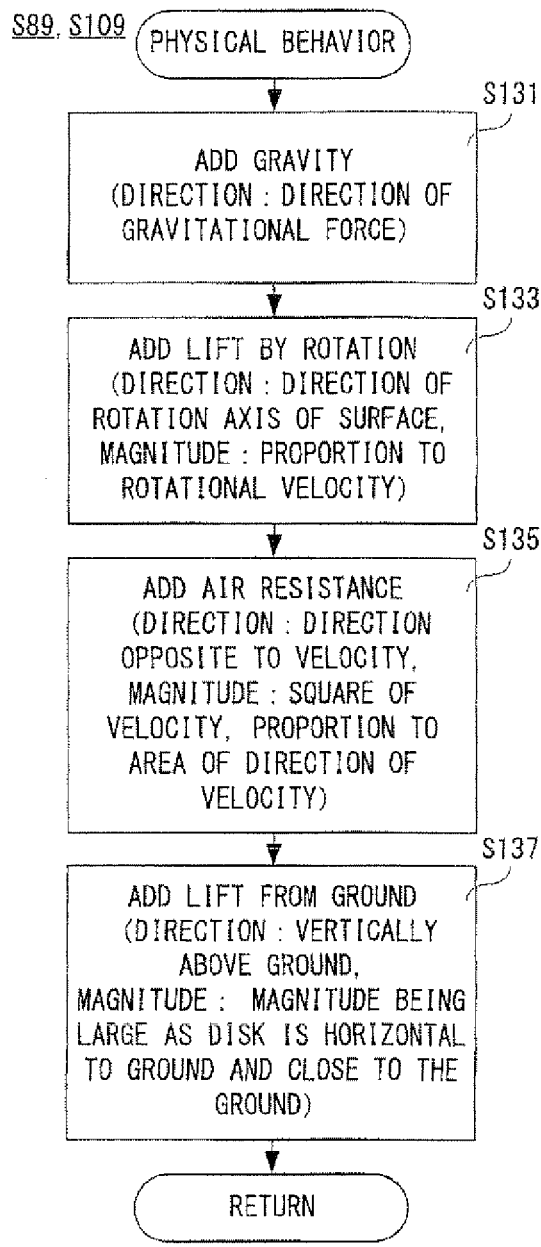
FIG. 26 is a flowchart showing physical behavior processing by the CPU shown in FIG. 2.

FIG. 26 is a flowchart of the physical behavior processing in the step S89 shown in FIG. 24 and in the step S109 in FIG. 25. As shown in FIG. 26, when starting the physical behavior processing, the CPU 40 adds gravity in a step S131. That is, gravity vertically below is worked on the moving object 104 in the three-dimensional virtual space. In a succeeding step S133, lift by rotations is added. That is, a force proportional to the rotational velocity $v_b$ is worked on the moving object 104 in a direction to which the rotation axis of the moving object 104 is rotated and in a direction toward the top surface of the moving object 104.

Next, in a step SI35, air resistance is added. That is, a force obtained by multiplying a square value of the moving velocity $v_a$ by a value proportional to the area of the moving object 104 when seen from the front is worked in an direction opposite to the moving velocity $v_a$ of the moving object 104. Then, in a step S137, a lift from the ground is added, and then, the process is returned to the throwing simulation processing shown in FIG. 24 or throwing processing shown in FIG. 25. That is, in the step S137, a force, which is greater as it is horizontal and closer to the ground, is worked on the moving object 104 to a direction normal to the ground (vertical upwards from the ground). For example, lift from the ground is decided depending on the distance between the moving object 104 and the ground and the inclination of the moving object 104. Thus, the lift according to the current position and orientation is added to the moving object 104.

According to this embodiment, the positions, the orientations and the motions of the objects within the three-dimensional virtual space can be controlled according to the attitudes of the controller connected with the gyro unit and its swinging movement, and therefore, it is possible to execute various processing with a simple operation.

In this embodiment, although the gyro sensor unit (gyro sensor) is connected to the controller, the gyro sensor may be included in the controller.

Furthermore, in this embodiment, in order to detect the position and attitude of the controller, a gyro sensor is used, but in place of the gyro sensor, a terrestrial magnetism sensor can be used. Alternatively, without the use of such sensors, positions and attitudes of the controller may be detected by a motion capturing system. That is, other sensors, if they are intended for detecting positions and attitudes of the controller, can be adopted.

In addition, in this embodiment, positions and orientations of the moving object are controlled by the positions and attitudes of the controller, but it is no need of being restricted thereto. For example, a position and an orientation of the moving object may be controlled on the basis of a position on the screen which is instructed with the controller (position of an instruction image such as a mouse pointer). This means that by detecting the instructed position with the controller, a position and an orientation of the controller are indirectly detected. As to the virtual game in the above-described embodiment, when the instruction image is moved from the center of the screen to the left direction (or right direction), the player object holding the moving object twists the body to the left direction (or right direction). In addition, when the instruction image is moved from the center of the screen to the up and down directions, the arm holding the moving object is moved up and down. That is, the orientation of the moving object is changed. In such a case, when a moving amount (displacement amount) of the instruction image per a given period of time is above a certain value, it may be determined that the moving object is thrown. Here, it is no need of being restricted to the structure in the embodiment, and an infrared rays LED is provided to the controller, an imaged information arithmetic section is provided in the vicinity of (on) the monitor, and the imaged information arithmetic section may be connected to the game apparatus.

In addition, in this embodiment, by positions and attitudes of the controller in the actual space, positions and orientations of the moving object in the three-dimensional virtual space are controlled, but other objects such as a virtual camera in the three-dimensional virtual space may be controlled. In a case that the virtual camera is controlled, a pan, a tilt, and a roll of the virtual camera are controlled by the attitude of the controller. When the angular velocity detected by swinging the controller in the gyro sensor is above a constant threshold value, the shutter of the virtual camera can be turned on. It should be noted that a zoom operation may be controlled instead of a roll operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an information processing program configured, when executed, to cause a computer of an information processing apparatus controlling a motion of an object within a virtual space on the basis of a status signal output from a detector configured to detect a status including at least one of a position and an attitude of an input device to perform functionality comprising at least:
   control said object such that said object performs a first motion within said virtual space on the basis of said status signal,
   determine whether or not information relative to a magnitude of said status signal satisfies a predetermined condition during when said object is controlled to perform said first motion within said virtual space, and
   control said object such that said object performs a second motion different from said first motion within said virtual space on the basis of said status signal in a case that the information relative to a magnitude of said status signal is determined to satisfy the predetermined condition.

2. A non-transitory storage medium storing an information processing program according to claim 1, wherein said detector includes a gyro sensor, and said status signal is a gyro signal.

3. A non-transitory storage medium storing an information processing program according to claim 2, wherein
   the determination of whether or not the information relative to a magnitude of said status signal satisfies the predetermined condition includes:
   calculating a magnitude of said gyro signal, and determining whether or not the calculated magnitude of the gyro signal is above a first predetermined value, and said object is controlled such that said object performs said second motion in a case that the magnitude of said gyro signal is determined to be above said first predetermined value.

4. A non-transitory storage medium storing an information processing program according to claim 3, wherein a moving velocity and a moving direction of said object is controlled on the basis of said gyro signal in a case that the magnitude of said gyro signal is determined to be above said first predetermined value.

5. A non-transitory storage medium storing an information processing program according to claim 3, wherein said input device further includes an acceleration sensor,
said information processing program further causes said computer to perform functionality comprising at least:
calculate an acceleration signal corresponding to an acceleration occurring to said input device on the basis of an output from said acceleration sensor,
control a moving velocity of said object on the basis of the calculated acceleration signal in a case that the magnitude of said gyro signal is determined to be above said first predetermined value, and
control a moving direction of said object on the basis of said gyro signal in a case that the magnitude of said gyro signal is determined to be above said first predetermined value.

6. A non-transitory storage medium storing an information processing program according to claim 3, wherein said information processing program further causes said computer to perform functionality comprising at least:
sequentially store magnitude data corresponding to the magnitude of said gyro signal in a storage location,
calculate, on the basis of magnitudes of a plurality of gyro signals indicated by the magnitude data stored in said storage location, an extreme of the magnitudes of said gyro signals,
determine whether or not the extreme of the magnitude of the gyro signal is above a second predetermined value, and
control said object such that said object performs said second motion within said virtual space on the basis of said gyro signal in a case that said extreme is determined to be above said second predetermined value.

7. A non-transitory storage medium storing an information processing program according to claim 3, wherein said information processing apparatus is a game apparatus for controlling a motion of said object within said virtual space.

8. A non-transitory storage medium storing an information processing program according to claim 7, wherein a moving velocity and a moving direction of said object are controlled on the basis of the gyro signal in a case that the magnitude of said gyro signal is determined to be above said first predetermined value.

9. A non-transitory storage medium storing an information processing program according to claim 7, wherein
said input device further comprises an acceleration sensor,
said information processing program further causes said computer to perform functionality comprising at least:
calculate an acceleration signal corresponding to an acceleration occurring to said input device on the basis of an output from said acceleration sensor,
control a moving velocity of said object on the basis of the calculated acceleration signal in a case that the magnitude of the gyro signal is determined to be above said first predetermined value, and
control a moving direction of said object on the basis of the gyro signal in a case that the magnitude of said gyro signal is above said first predetermined value.

10. A non-transitory storage medium storing an information processing program according to claim 7, wherein said information processing program further causes said computer to perform functionality comprising at least:
sequentially store magnitude data corresponding to the magnitude of said gyro signal in a storage location,
calculate, on the basis of magnitudes of a plurality of gyro signals indicated by the magnitude data stored in said storage location, an extreme of the magnitudes of said gyro signals,
determine whether or not the extreme of the magnitude of the gyro signal is above a second predetermined value, and
control said object such that said object performs said second motion within said virtual space on the basis of the gyro signal in a case that said extreme is determined to be above said second predetermined value.

11. A non-transitory storage medium storing an information processing program according to claim 1, wherein said object is arranged within said virtual space according to at least any one of a position and an orientation which are decided on the basis of said status signal.

12. A non-transitory storage medium storing an information processing program according to claim 1, wherein said input device is formed with a single housing.

13. An information processing apparatus for controlling a motion of an object within a virtual space on the basis of a status signal output from a detector configured to detect a status including at least one of a position and an attitude of an input device, comprising:
a first motion controller configured to control said object such that said object performs a first motion within said virtual space on the basis of said status signal,
a condition determining circuit configured to determine whether or not information relative to a magnitude of said status signal satisfies a predetermined condition during when said object is controlled to perform said first motion within said virtual space, and
a second motion controller configured to control said object such that said object performs a second motion different from said first motion on the basis of said status signal within said virtual space in a case that said condition determining circuit determines that the information relative to a magnitude of said status signal satisfies the predetermined condition.

14. An information processing method of an information processing apparatus for controlling a motion of an object within a virtual space on the basis of a status signal output from a detector configured to detect a status including at least one of a position and an attitude of an input device, the method comprising:
(a) controlling, in connection with the information processing apparatus, said object such that said object performs a first motion within said virtual space on the basis of said status signal,
(b) determining whether or not information relative to a magnitude of said status signal satisfies a predetermined condition during when said object is controlled to perform said first motion within said virtual space, and
(c) controlling, in connection with the information processing apparatus, said object such that said object performs a second motion different from said first motion within said virtual space on the basis of the status signal in a case that the information relative to a magnitude of said status signal is determined to satisfy the predetermined condition in (b).

15. An information processing system for controlling a motion of an object within a virtual space on the basis of a status signal output from a detector configured to detect a status including at least one of a position and an attitude of an input device, comprising:

processing resources, including at least one processor and a memory, configured to:

control said object such that said object performs a first motion within said virtual space on the basis of said status signal, determine whether or not information relative to a magnitude of said status signal satisfies a predetermined condition during when said object is controlled to perform said first motion within said virtual space, and control said object such that said object performs a second motion different from said first motion on the basis of said status signal within said virtual space in a case that said condition determining circuit determines that the information relative to a magnitude of said status signal satisfies the predetermined condition.

* * * * *